(12) United States Patent
Saidi et al.

(10) Patent No.: US 9,495,560 B2
(45) Date of Patent: Nov. 15, 2016

(54) POLYMORPHIC VIRTUAL APPLIANCE RULE SET

(71) Applicant: SRI International, Menlo Park, CA (US)

(72) Inventors: Hassen Saidi, Menlo Park, CA (US); Scott A. Oberg, Paso Robles, CA (US); Christopher S. Lockett, Santa Clara, CA (US); Sean M. Forsberg, San Luis Obispo, CA (US); Jeffrey E. Casper, San Carlos, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 24 days.

(21) Appl. No.: 14/052,169

(22) Filed: Oct. 11, 2013

(65) Prior Publication Data

US 2014/0380406 A1  Dec. 25, 2014

Related U.S. Application Data

(60) Provisional application No. 61/839,202, filed on Jun. 25, 2013.

(51) Int. Cl.

| | |
|---|---|
| *G06F 21/74* | (2013.01) |
| *H04L 29/06* | (2006.01) |
| *G06F 9/54* | (2006.01) |
| *G06F 21/60* | (2013.01) |
| *G06F 21/00* | (2013.01) |

(Continued)

(52) U.S. Cl.
CPC .............. *G06F 21/74* (2013.01); *G06F 9/542* (2013.01); *G06F 21/00* (2013.01); *G06F 21/575* (2013.01); *G06F 21/60* (2013.01); *H04L 63/08* (2013.01); *H04L 63/20* (2013.01); *G06F 2221/2101* (2013.01); *H04W 12/06* (2013.01); *H04W 12/08* (2013.01)

(58) Field of Classification Search
CPC .................... G06F 21/74; G06F 21/60; G06F 21/604; G06F 21/62; H04W 12/08; H04W 12/06

See application file for complete search history.

(56) References Cited

U.S. PATENT DOCUMENTS 6,148,323 A * 11/2000 Whitner ................. G06F 11/28
                                                                714/E11.178
8,519,820 B2   8/2013 Cannistraro
(Continued)

OTHER PUBLICATIONS

McCammon et al., "SecureIT Mobile How to Bulid a More Secure Smartphone with Mobile Virtualization and other Commercial Off-the-Shelf Technology" Sep. 2010, pp. 1-14.*

(Continued)

*Primary Examiner* — Jung Kim
*Assistant Examiner* — Carlos M De Jesus Lassala
(74) *Attorney, Agent, or Firm* — Barnes & Thornburg LLP

(57) ABSTRACT

A domain manager system as disclosed herein can control the selective activation of multiple independently-operable execution environments or domains on a computing device in accordance with one or more policies. In some embodiments, activation of a domain may at least temporarily transform a general purpose computing device into a specific purpose computing device or "appliance" by disabling use of one or more shared system resources by other domains.

23 Claims, 11 Drawing Sheets

(51) Int. Cl.
*G06F 21/57* (2013.01)
*H04W 12/08* (2009.01)
*H04W 12/06* (2009.01)

(56) References Cited

U.S. PATENT DOCUMENTS

| | | | | |
|---|---|---|---|---|
| 2005/0261029 A1* | 11/2005 | Yang | ................... | G06F 3/0236 455/564 |
| 2005/0273571 A1* | 12/2005 | Lyon | ................... | G06F 9/45537 711/203 |
| 2007/0189526 A1* | 8/2007 | Davidson | ............. | H04L 9/0618 380/44 |
| 2010/0029303 A1* | 2/2010 | Lim | ................... | H04L 12/1859 455/466 |
| 2010/0064341 A1* | 3/2010 | Aldera | ................. | H04L 63/102 726/1 |
| 2012/0283397 A1* | 11/2012 | Takahashi | .............. | C08F 12/08 526/124.1 |
| 2013/0152092 A1 | 6/2013 | Yadgar | | |
| 2014/0059642 A1* | 2/2014 | Deasy | ................... | G06F 21/53 726/1 |
| 2015/0073499 A1* | 3/2015 | Kothandaraman | .. | A61N 1/3605 607/59 |

OTHER PUBLICATIONS

Boethhcher et al., "The MILS Component Integration Approach to Secure Information Sharing", Sep. 2008, pp. 1-12 http://www.csl.sri.com/users/rushby/papers/dasc08.pdf.*

SRI International, "SRI International Begins Final Development of Commercial Trusted Mobility Devices for U.S. Marine Corps," Apr. 8, 2013, 1 page, available at http://www.sri.com/newsroom/press-releases/sri-begins-final-development-commercial-trusted-mobility-devices.

Carl L. Nerup et al., "A High Assurance Framework for Mobile/Wireless Device Applications," 2012, 15 pages, available at http://www.ok-labs.com/_assets/OK-WP-High-Assurance-Framework-022712.pdf.

Rob McCammon, "SecureIT Mobile: How to Build a More Secure Smartphone with Mobile Virtualization and Other Commercial Off-the-Shelf Technology," 2010, 14 pages.

Grit Denker et al., "Policy-Based Date Downgrading: Toward a Semantic Framework and Automated Tools to Balance Need-To-Protect and Need-To-Share Policies," IEEE International Symposium on Policies for Distributed Systems and Networks, Jun. 17, 2010. 9 pages.

Common Criteria for Information Tehcnology Security Evaluation, "Part 1: Introduction and General Model," v. 3.1, rev. 3, Jul. 2009, 93 pages, available at http://www.commoncriterialportal.org/files/ccfiles/ CCPART1V3.1R3.pdf.

Common Criteria for Information Tehcnology Security Evaluation, "Part 2: Security Functional Components," v. 3.1, rev. 3, Jul. 2009, 321 pages, available at http://www.commoncriterialportal.org/files/ccfiles/CCPART2V3.1R3.pdf.

Common Criteria for Information Tehcnology Security Evaluation, "Part 3: Security Assurance Components," v. 3.1, rev. 3, Jul. 2009, 232 pages, available at http://www.commoncriterialportal.org/files/ccfiles/CCPART3V3.1R3.pdf.

J. M. Rushby et al., "The MILS Component Integration Approach to Secure Information Sharing," Proceedings of the 27th IEEE/AIAA Digital Avionics Systems Conference, 2008, 12 pages, St. Paul, MN, USA.

National Information Assurance Partnership: Common Criteria Evaluation & Validation Scheme, "U.S. Government Protection Profile for Separation Kernels in Environments Requiring High Robustness," v. 1.03, Jun. 29, 2007, 182 pages, available at http://www.niap-ccevs.org/pp/pp_skpp_hr_v1.03.pdf.

Rance Delong et al., "Toward a Medium-Robustness Separation Kernel Protection Profile," 2007, 10 pages available at http://www.acsac.org/2007/papers/168.pdf.

Jonathon Corbet, "dm-verity", Rhino Security Labs, 2011, 4 pages.

Dmitry Kasatkin, "[dm-devel] [Patch 0/1] dm-integrity: Integrity Protection Device-Mapper Target", http://www.redhat.com/archives/dm-devel/2012-Septemeber/msg00320.html, 2 pages.

TrustZone, ARM The Architecture for the Digital World; http://www.arm.com/products/processors/technologies/trustzone.php, 5 pages.

Trustonic; Trusted Execution Environment, http://www.trustonic.com/products-services/trusted-execution-environment, 1 page.

Open Kernel Labs, OKL4 Microviser : Open Kernel Labs, http://www.ok-labs.com/products/okl4-microvisor, 4 pages.

Christopher S. Lockett et al., unpublished U.S. Appl. No. 14/052,266, filed Oct. 11, 2013, 140 pages.

Hassen Saidi et al., unpublished U.S. Appl. No. 14/052,169, filed Oct. 11, 2013, 55 pages.

Sean M. Forsberg et al., unpublished U.S. Appl. No. 14/052,080, filed Oct. 11, 2013, 69 pages.

Scott A. Oberg et al., unpublished U.S. Appl. No. 14/051,923, filed Oct. 11, 2013, 70 pages.

Scott A. Oberg et al., unpublished U.S. Appl. No. 13/872,865, filed Apr. 29, 2013, 49 pages.

Kenneth C. Nitz et al., unpublished U.S. Appl. No. 13/585,003, filed Aug. 14, 2012, 63 pages.

Kenneth C. Nitz et al., unpublished U.S. Appl. No. 13/585,008, filed Aug. 14, 2012, 63 pages.

Edgar T. Kalns et al., unpublished U.S. Appl. No. 13/891,858, filed May 10, 2013, 67 pages.

Edgar T. Kalns et al., unpublished U.S. Appl. No. 13/891,864, filed May 10, 2013, 65 pages.

Unpublished U.S. Appl. No. 61/839,202, filed Jun. 25, 2013, 63 pages.

Redbend Software, A New Solution for Managing Embedded Handset Software, printed May 7, 2013, 6 pages.

GlobalPlatform made simple guide: Trusted Execution Environment (TEE) Guide, available at http://www.globalplatform.org/mediaguidetee.asp, printed Aug. 16, 2013, 4 pages.

"SRI International Begins Final Development of Commercial Trusted Mobility Devices for U.S. Marine Corps," Apr. 8, 2013, 2 pages, "www.sri.com/newsroom/press-releases/sri-begins-fi nal-development-commercial-trusted-mobility-devices."

* cited by examiner

POLYMORPHIC VIRTUAL APPLIANCE RULE SET

CROSS-REFERENCES TO RELATED APPLICATIONS

This application claims the benefit of and priority to U.S. Provisional Patent Application Ser. No. 61/839,202, filed Jun. 25, 2013, which is incorporated herein by this reference in its entirety.

This application is related to U.S. Utility application Ser. No. 13/872,865 filed Apr. 29, 2013, of Oberg et al., titled "Operating System Independent Integrity Verification," which is incorporated herein by this reference in its entirety.

This application is related to U.S. Utility application Ser. No. 14/051,923 filed on even date herewith, of Oberg et al., titled "Componentized Provisioning," which is incorporated herein by this reference in its entirety.

This application is related to U.S. Utility application Ser. No. 14/052,080 filed on even date herewith, of Forsberg et al., titled "Flexible Policy Arbitration Control Suite," which is incorporated herein by this reference in its entirety.

This application is related to U.S. Utility application Ser. No. [TBD] filed on even date herewith, of Lockett et al., titled "Polymorphic Computing Architectures," Attorney Docket No. SRI-US-6788-3/55434-226816, which is incorporated herein by this reference in its entirety.

BACKGROUND

Traditional system architectures for computing platforms, and mobile systems in particular (such as smart phones, tablet computers, wearable devices, and others), have a monolithic, vertical design in which execution of applications stored on the file system, device drivers, and software stacks, is controlled by the operating system kernel. A consequence of traditional system architectures is the co-location of the software into a single environment, resulting in several million lines of software code for a single system. A direct result is a highly complicated, co-mingled architecture in which it is extremely difficult to identify, mitigate and correct vulnerabilities. A security issue raised by a software application running on the device can therefore impact the entire system. As a consequence, it can be challenging to reliably and consistently maintain the security of the execution environment in these traditional, overly complex systems.

The potential security risks posed by the "openness" of certain architectures (e.g., ANDROID) and by the downloading of third-party software are well-documented. The risks are even more pronounced when a computing device is used for multiple different, potentially conflicting purposes. Such may be the case in the "bring your own device" (BYOD) context in which computing devices, and more particularly, mobile computing devices, are used for both business and personal matters. These and other issues have spawned a "mobile device management" (MDM) industry.

Virtualization technology has long been a component of data center and desktop computing. Efforts are being made to apply virtualization technology to mobile devices. Proponents of mobile device virtualization believe that the technology can accelerate the development and deployment of new mobile device software at a lower cost. However, security risks exist whether a traditional monolithic or virtualized architecture is used.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
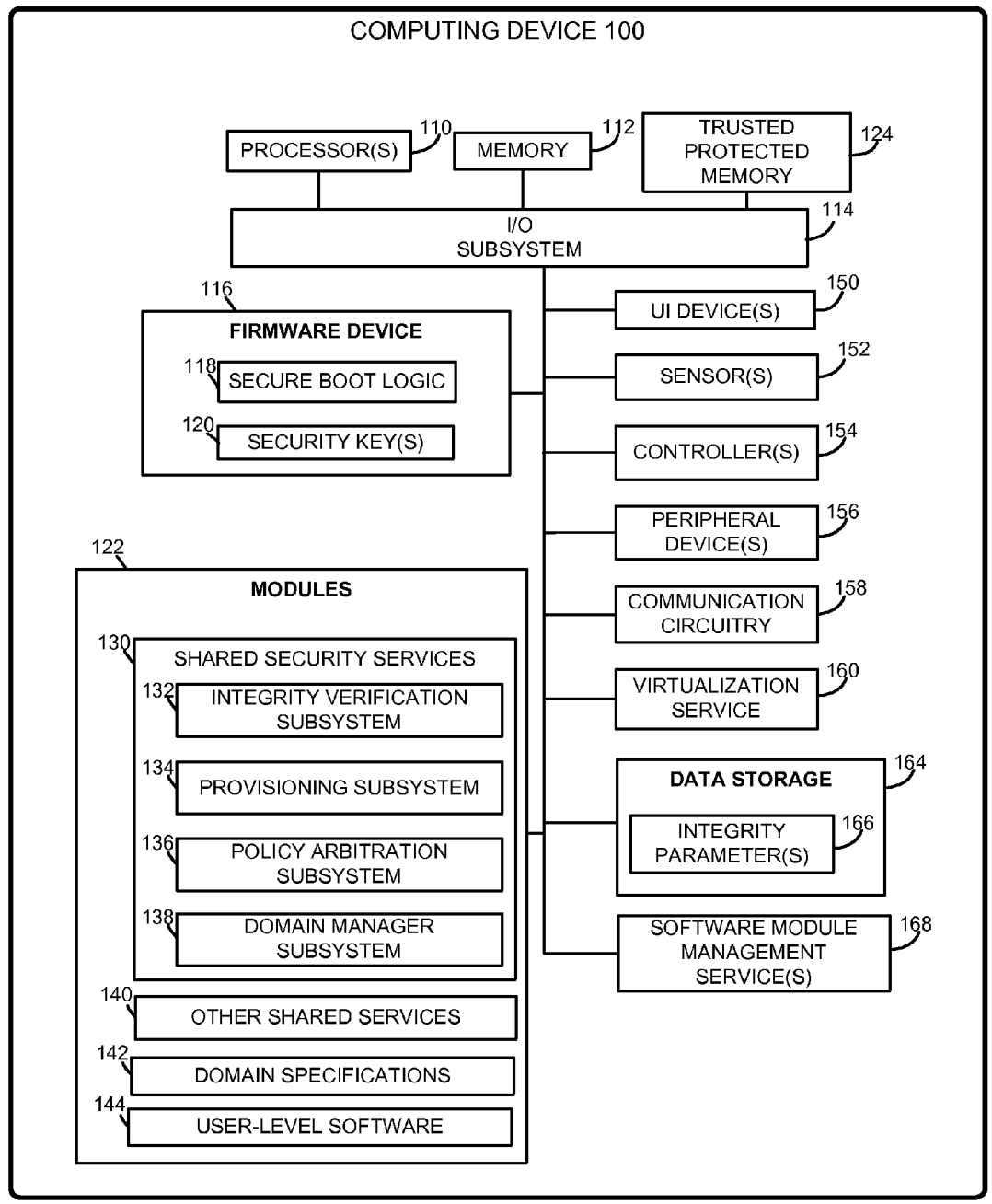
FIG. 1 is a simplified block diagram of at least one embodiment of a system architecture for a computing device, including a policy arbitration subsystem as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Existing mobile device management ("MDM") and other policy solutions implement static, monolithic security policies that are designed for the traditional architectures. As a result, these solutions are unable to dynamically control the use and sharing of the device's system resources, e.g., based on the current purpose of the device. For example, traditional policy solutions are unable to detect whether, in a given circumstance, a device is being used for a specific purpose, such as a personal matter or a business-related transaction. As such, these solutions result in inflexible and often over-restrictive policy as the lack of context means they must always enact the most protective measures. While the overly protective policy measures achieve the "need to protect" requirements, they simultaneously fail to achieve the "need to share" requirements.

MILS (Multiple Independent Levels of Security) concepts can be applied to these and other computing environments to provide a modular, component-based approach to secure system architectures, policy arbitration and enforcement, domain activation and deactivation, and system certification. In general, a MILS-based platform is comprised of components that share physical resources while creating strongly separated exported resources. When composed "additively," these resources form a distributed resource sharing substrate, which may be referred to as a MILS platform. In high assurance applications, the use of a separation kernel is a component of the MILS platform. The separation kernel architecture provides for a functionally "distrusted" system of individual, separated components with well defined, limited communication channels between the components ("distrusted" in the sense that the individual components are not assumed to be trusted from a security standpoint). As used herein, a "well-defined" communication channel may refer to, among other things, one or more signal paths, which can be implemented in hardware or software, and may be implemented as a logical interface between two logical (e.g., virtualized) units, where the interface is clearly defined so that the entities on either end of the communication channel or channel are known and unchangeable, and the type of communications that are permitted to be sent over the communication channel/channel are also known and unchangeable. Once each of these well-defined communication channels or channels has been validated as such, it need not be continuously re-validated.

As disclosed herein, a flexible, distributed policy architecture for, controlling domain activation, use, and deactivation, can be realized, for example, upon a MILS-based platform. Such a policy architecture can be realized by operational components of the architecture to achieve a particular domain or system purpose. In the abstract, the policy architecture defines components (e.g., subjects/objects/domains/applications) and interactions between the components. Isolation and information flow control policies govern the existence of the architectural components on the platform and their interactions with system resources and other components. Isolation policies provide that there is no direct interaction between the components. Information flow control policies define explicitly permitted causality or interference between the components. Whereas current mobility policy and MDM solutions are only as secure as their parent process, aspects of the disclosed approach can provide a peer-based architecture in which peer components (such as those found in a virtualized system) are isolated from one another so as to be protected from other peer components should any of the components be compromised. Among other things, a peer-based policy architecture as disclosed herein enables individual components' policies to exist without prior or current knowledge of other individual component policies.

Portions of this disclosure describe embodiments of a domain manager subsystem that is adapted for use on a mobile computing platform that has a modular, virtualized system architecture. Some embodiments of modular, virtualized mobile computing platforms can be configured with multiple different user-level execution environments, each of which may be tailored for a different use or application of the mobile device. A mobile platform designed with such an architecture can, for example, address security issues that commonly arise when personal mobile devices are used for business purposes or vice versa. Nonetheless, it should be appreciated that the disclosed approach is not limited to virtualized mobile platforms; rather, aspects of the disclosed approach can be used in traditional and/or virtualized platforms to, for example, extend a static, global device policy to a more flexible implementation in which multiple independent and potentially conflicting policies (e.g., enterprise vs. personal) can be mitigated using a variety of techniques, including warnings and disabling of features.

Some versions of the disclosed domain manager subsystem are embodied in a context-aware device (e.g., a mobile device equipped with one or more "environment" sensors, such as a GPS, accelerometer, and/or others). Such embodiments can extend a MILS-based policy architecture by enabling dynamic or semi-dynamic policy implementations in the context-aware device. For example, some embodiments of the domain manager subsystem can, in combination with a policy arbitration subsystem, manage and enforce the embedded policies of isolated, distributed architectural components that are designed for specific purposes. Such policies may be statically pre-defined, e.g., as information flow control channels between isolated MILS-based components. As used herein, "policy" may refer to, among other things, an expression of enforcement, monitoring, and/or other capabilities that are needed on the computing device to ensure that the computing device or a component thereof operates according to a defined purpose and does not perform the associated anti-purpose. For example, a policy may define criteria for sharing and/or protecting information and components of the computing device under various conditions and contexts. The policy may be implemented, for example, as a set of rules, instructions, data values, parameters, or a combination thereof, which may be stored in, for example, a database or table in trusted protected memory 124.

In some embodiments, the disclosed approach extends the purpose/anti-purpose concepts discussed in Denker et al., "Policy-Based Downgrading: Toward a Semantic Framework and Automated Tools to Balance Need-to-Protect and Need-to-Share Policies," (SRI: was this paper published? please complete this cite) to a MILS-enabled semi-dynamic domain manager subsystem. For instance, MILS-based components and policies that are only designed to achieve a particular "purpose" may in some contexts result in realizing an "anti-purpose" of the system (an unintended consequence). As an example, a high-resolution GPS (Global Positioning System) location of an asset may need to be used by a security-vetted domain to achieve a defined "purpose," but in doing so, the required amount of detail of the shared location information may violate a security policy "anti-purpose" of the domain—e.g., "I would like certain trusted people to know the specific location of the asset . . . but other people do not need to know exactly where it is located." In this case, the disclosed domain manager subsystem may restrict access to or downgrade the GPS data provided to other domains while the domain requiring higher-resolution location information is activated.

The disclosed domain manager subsystem may be embodied as a suite of software components, such as API (Application Programming Interface) extensions. However, some embodiments of the domain manager subsystem extend beyond software-only implementations. For example, some embodiments enable policy-based domain controls in systems that are designed with advanced materials in which physical properties are modified in specific contexts, such as temperature, radio frequency (RF) fields, electro-magnetic fields, and/or others. In some instances, the physical properties themselves may be a realization of a physics-based embedded policy designed for a specific purpose. When a domain is activated, embodiments of the domain manager subsystem may deny access by other components to selected parts of the system. For example, component-based power control can in itself be a realization of the MILS-based "isolation" policy. As such, powering down a GPS or radio receiver is one form of isolation. Thus, in some cases, the disclosed domain manager subsystem can be used to implement domain-based low level resource management (e.g., device management that extends beyond the software/application layer to hardware/firmware layers) and other similar concepts, where low-level control of system components can achieve a desired "purpose" and deny the "anti-purpose" of an activated domain.

In some embodiments, the disclosed domain manager subsystem can be employed to provide a high assurance of security for "multiple-personality" computing devices. In such devices, different user-level execution environments (e.g., personal and enterprise domains, or "unclassified" and "classified" domains) may be isolated from one another using the MILS-based techniques, so as to, for example, simultaneously protect personal privacy and enterprise security while enabling appropriate data sharing. For instance, one domain may allow a mobile device user to access personal records such as e-mail, medical data, or financial reports, but deny access to other domains, while another domain may permit access to data and applications involving very highly confidential or secret business information, processes or operations, but deny such access to other domains. To do this, embodiments of the domain manager subsystem may cooperate with domain isolation, encryption, policy, and other related security technologies developed by SRI International, which can be embedded into smart phones and other mobile platforms, as described in more detail below and in other patent applications of SRI International, including the related patent applications identified above. Some examples of high assurance, multiple-personality mobile devices that have been developed by SRI International were mentioned in the press release, "SRI International Begins Final Development of Commercial Trusted Mobility Devices for U.S. Marine Corps," Apr. 8, 2013.

Referring now to FIG. 1, an illustrative domain manager subsystem 138 is embodied as software, firmware, hardware, or a combination thereof, to perform domain activation, switching, and deactivation services during the operation of a computing device 100. The domain manager subsystem 138 responds to user-initiated domain triggers 524 and/or event triggers 526 by activating and deactivating domains, and by switching from one active domain to another, in accordance with an applicable policy or policies of the computing device 100. As noted above, embodiments of the domain manager subsystem 138 or portions thereof may control or initiate control of shared system resources, including hardware components, in response to a domain activation or deactivation. For example, access to a camera, microphone, or sensor data may be selectively restricted or enabled as part of a domain activation or deactivation handled by the domain manager subsystem 138.

In some embodiments, the domain manager subsystem 138 comprises a "rule set" of computer programming constructs (e.g., both on and off-device.) For example, the domain manager subsystem 138 may define an application programming interface (API) or a suite of APIs or API extensions. The APIs may be implemented as a software library, a software framework (e.g., a collection of different software libraries implementing different APIs), a protocol or set of protocols, or another type of programming interface that allows computer programs to communicate with each other and with shared computing resources.

The illustrative computing device 100 is embodied as a mobile computing device configured with a modular, virtualized system architecture, as described in more detail below. It should be understood, however, that the computing device 100 may be any type of computing device, e.g., a device that has a virtualized architecture, a traditional system architecture, or a traditional system architecture configured to provide some virtualization features. For example, the computing device 100 may be embodied as any type of personal computer (e.g., desktop, laptop, net book, e-reader, tablet, smart phone, body-mounted device, or mobile appliance), a server, an enterprise computer system, a network of computers, the network infrastructure itself, a combination of computers and other electronic devices, or other types of electronic device, including wearable computing devices, smart appliances, medical monitoring and sensing devices, commercial personal devices, health monitoring devices, embedded scientific and sensing devices, UAV's (unmanned aerial vehicles), SUAV's (small unmanned air vehicles), other types of unmanned vehicles, and other safety critical systems.

Thus, while not specifically shown in FIG. 1, it should be understood that portions of the domain manager subsystem 138 can reside on other computing devices or computing systems, in some embodiments as a distributed policy system. For example, a portion of the domain manager subsystem 138 may be local to the computing device 100, while another portion may be distributed across one or more other computing systems or devices that are in communication with the computing device 100 by one or more electronic communication networks, via communication subsystem 158, for example. In other embodiments, the domain manager subsystem 138 may be located entirely on the computing device 100.

The illustrative computing device 100 includes at least one central processing unit or processor 110 (e.g., a microprocessor, microcontroller, digital signal processor, etc.), memory 112, trusted protected memory 124, and an input/output (I/O) subsystem 114. For example, in some embodiments, the processor(s) 110 include separate baseband and applications processors. In these embodiments, features of the baseband processor and the applications processor may be located on the same or different hardware devices (e.g., a common substrate). In general, the baseband processor interfaces with other components of the device/platform 100 and/or external components to provide, among other things, wireless communication services, such as cellular, BLUETOOTH, WLAN, and/or other services. In general, the applications processor handles processing required by software and firmware applications running on the computing device/platform 100, as well as interfacing with various sensors and/or other system resources 210. However, it should be understood that features typically handled by the baseband processor 126 may be handled by the applications processor 128 and vice versa, in some embodiments.

The processor(s) 110 and the I/O subsystem 114 are communicatively coupled to the memory 112 and the trusted protected memory 124. The memory 112 and the trusted protected memory 124 may be embodied as any type of suitable computer memory device (e.g., volatile memory such as various forms of random access memory). More specifically, the trusted protected memory 124 is configured to provide component isolation in accordance with the MILS-based techniques, as described in more detail below with reference to FIG. 3.

The I/O subsystem 114 may include, among other things, an I/O controller, a memory controller, and one or more I/O ports. In some embodiments, the I/O subsystem 114 may form a portion of a system-on-a-chip (SoC) and be incorporated, along with the processor 110 and other components of the computing device 100, on a single integrated circuit chip. As such, each or any of the components coupled to the I/O subsystem 114 may be located on a common integrated circuit chip, in some embodiments.

The illustrative I/O subsystem 114 is communicatively coupled to a number of hardware, firmware, and software components, including a firmware device 116, a number of executable modules 122, a number of user interface devices 150 (e.g., a touchscreen, keyboard, virtual keypad, microphone, etc.), one or more sensors 152 (e.g., optical sensors, motion sensors, location sensors, global positioning system (GPS) receivers, digital cameras, and the like), controllers 154 (e.g., memory controllers, I/O controllers, network interface controllers, graphics controllers, etc.), other peripheral devices 156 (e.g., cameras, audio recorders, modems, data storage interfaces, displays, speakers, and other peripheral devices), the communication subsystem 158, a virtualization service 160, one or more data storage devices 164, and one or more software module management services 168.

The illustrative firmware device 116 is embodied as a persistent storage device such as a non-volatile or read-only memory device (e.g., NAND or NOR flash memory). In the illustrative embodiments, the firmware device 116 stores secure boot logic 118. The secure boot logic 118 includes the set of computer routines commonly known as, for example, the bootloader, Unified Extensible Firmware Interface (UEFI), or Basic Input/Output System (BIOS). The secure boot logic 118 enables the computing device 100 to start its operation once electrical power to the device is switched on, or to restart its operation in response to a user command. In some embodiments (e.g., traditional system architectures), the secure boot logic 118 loads and starts an operating system and communicates with the various other components and devices that are coupled to the I/O subsystem 114. In the illustrative virtualized mobile device architecture, however, the secure boot logic 118 loads and starts the virtualization service 160 directly from the firmware device 116, without or prior to launching any operating systems.

In some embodiments, one or more security keys 120 used by the secure boot logic 118 and/or other modules 122 may be stored in the firmware device 116. The security keys 120 may include, for example, one or more public keys used in a digital signature scheme, which may be employed to authenticate one or more integrity parameters 166. The integrity parameters 166 may include trusted block device hashes, which may be computed at initial installation of a software module 122 by a trusted party. The integrity parameters 166 may also include current block device hashes that are computed during use of the computing device 100, e.g., at software load time. More generally, the integrity parameters 166 can include or reference information (such as hash values) that can be evaluated by the secure boot logic 118 and/or other modules 122 to check the integrity of executable components of the computing device 100 (including, but not limited to, the policy arbitration subsystem 136) at load time or at run time. The integrity parameters 166 and the use thereof by the computing device 100 are described in more detail in Oberg et al., U.S. patent application Ser. No. 13/872,865.

In the illustrative computing platform depicted by FIG. 1, the modules 122 include shared, modular security services 130 and other shared, modular services 140 that, together with the virtualization service 160, form a trusted computing base (TCB). The shared security services 130 illustratively include an integrity verification subsystem 132, a provisioning subsystem 134, the policy arbitration subsystem 136, and a domain manager subsystem 138. The shared security services 130 are described in more detail below with reference to FIG. 2. The other shared services 140 include system-level services, such as device drivers, which are, in more traditional system architectures, typically provided by the operating system kernel. As used herein, "shared service" may refer to a firmware or software-based executable module that allows operating systems and other executable applications and processes to interface with the shared system resources of the computing device 100, which may include, for example, physical or hardware resources such as one or more of the processors 110, memory 112, memory 124, I/O subsystem 114, and/or any of the devices and components that are coupled to the I/O subsystem 114, whether such components are coupled directly (e.g., via bus) or over a network.

In the illustrative platform 100, the shared services 140 are virtualized at the module level, so that in a given virtualized execution environment of the computing device 100, the shared services 140 each map to a corresponding system resource. For example, some of the shared services 140 may be embodied as device drivers that each map to a physical device driver for a different hardware component of the computing device 100. By modularizing and isolating the shared services 140 independently of any particular component or domain, access to the shared resources of the computing device 100 can be monitored, controlled and restricted at the module level. In general, the modules 122 are illustrated as such for discussion purposes, and such illustration is not intended to imply that any specific implementation details are required. For example, any of the modules 122 may be combined or divided into submodules, subprocesses, or other units of computer code or data as may be required by a particular design or implementation of the computing device 100.

In FIG. 1, the domain specifications 142 represent runtime specifications for individual, specially partitioned execution environments that can be executed by the virtualization service 160 during operation of the computing device 100. As used herein, "domain" may be used to refer to, among other things, a machine-executable unit that can request access to one or more system resources, where such accesses can be controlled by the policy arbitration subsystem 136. For example, some domains may be embodied as very small, specialized functional units. Each of the individual security services 250 and/or shared services 220 (collectively, shared services 218) (FIG. 2) may be embodied as domains, in some cases. Other domains may be embodied as "user domains" through which a person, such as an end user, may interact with the computing device 100. The domains 260, 270 (FIG. 2) are examples of user domains, as explained further below.

The domain specifications 142 for each domain specify one or more executable modules that are permitted to execute in the domain to request access to one or more shared system resources. For example, the domain specifications 142 for each user domain may specify user-level software 144 that is permitted to execute in the user domain.

The user-level software 144 includes, for example, an operating system and one or more user-level software applications. Thus, with respect to the domain specifications 142, the term "modules 122" may refer to module or modules (e.g., the user-level software 144) that is associated with the domain specification 142 rather than the specification itself. Each domain specification 142 may define a different "purpose" or "personality" of the computing device 100, as may be needed or desired, depending on the particular design, purpose, or usage context of the computing device 100.

The illustrative virtualization service 160 is embodied as a type of hypervisor, separation kernel or system enabled with hardware-based virtualization extensions, which is launched by the secure boot logic 118 directly from the firmware 116 rather than by an operating system. For example, the virtualization service 160 may be embodied as a "thin" hypervisor, which may refer to a type of hypervisor that is designed to be "small," in the sense that only the core functions that are needed to establish virtualization on the computing device 100 are included in the hypervisor. For example, in the illustrative embodiment, many if not all of the shared services 130, 140 are not built into the hypervisor but operate at a level of abstraction above the hypervisor (e.g., as "middleware"). In some embodiments, some components of the shared services 130, 140 are built into the hypervisor (e.g., communication channels which allow the "secure" connection between two components/modules/domains).

In some embodiments, however, the virtualization service 160 may include a more traditional hypervisor, virtual machine manager (VMM), or similar virtualization platform. In some embodiments, the virtualization service 160 may be embodied as a "bare metal" hypervisor, which can execute directly from the system hardware (e.g., by a processor 110 rather than the secure boot logic 118 or an operating system).

In general, the virtualization service 160 is embodied as a privileged software component that facilitates and manages the virtualization of the shared resources of the computing device 100. In some embodiments, portions of the virtualization service 160 may be firmware-based rather than software-based. The virtualization service 160 allows the domains 260, 270 (FIG. 2) defined by the domain specifications 142 to execute concurrently or serially on the computing device 100 in isolated, virtualized execution environments.

As mentioned above, in the illustrative embodiments, the virtualization service 160 is launched directly by the secure boot logic 118 rather than by an operating system. In other embodiments (e.g., traditional system architectures), the virtualization service 160 may be launched by an operating system or by system hardware (e.g., a processor 110). In any case, the virtualization service 160 executes in a higher-privileged system mode of the computing device 100, as opposed to a lesser-privileged mode. As such, in operation, the virtualization service 160 may have substantially full control of the system resources of the computing device 100. Further, the other components of the trusted computing base (e.g., the shared security services 130 and the other shared services 140) may, when called upon by the virtualization service 160, also have substantially full control of one or more of the system resources of the computing device 100 with which they are designed to communicate. That is, due to their modularity, the shared services 130, 140 may each be capable of controlling only a specific resource or a specific feature of a resource of the computing device 100, in some embodiments. In some embodiments, the modularized control of the system resources by the trusted computing base 130, 140, 160 is aided by the use of well-defined communication channels, as described herein.

Figure 3:
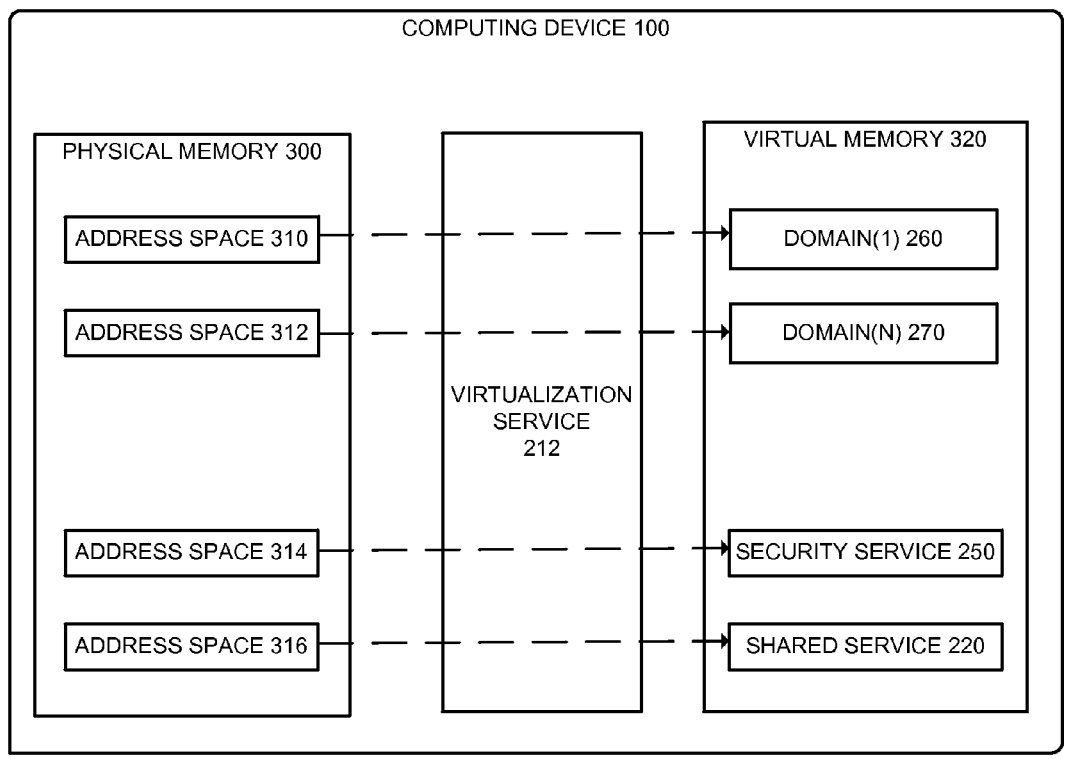
FIG. 3 is a simplified block diagram of a portion of the virtualized execution environment of FIG. 2, illustrating at least one embodiment of a memory isolation scheme as disclosed herein.
Figure 4:
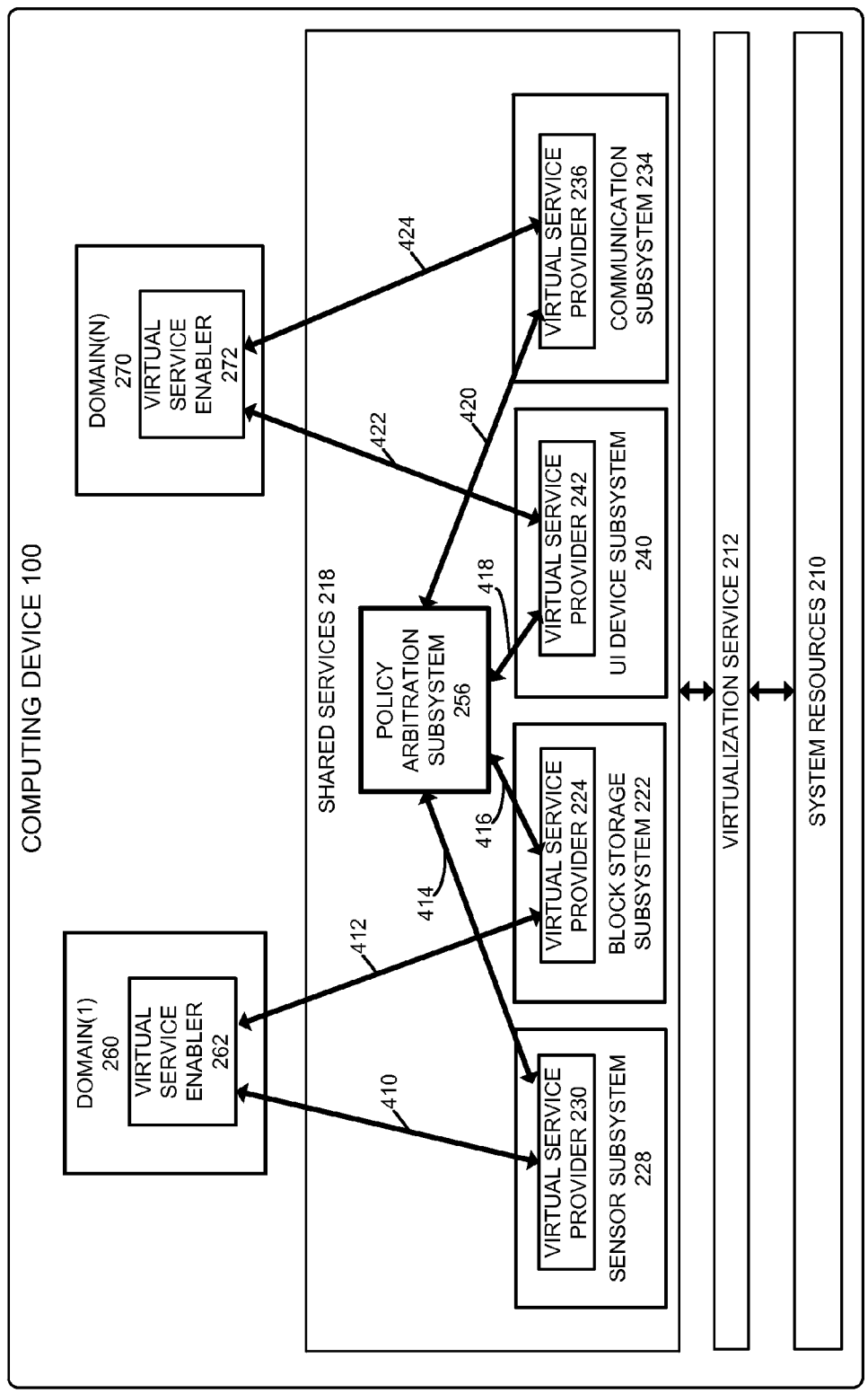
FIG. 4 is a simplified module diagram of an illustrative portion of the virtualized execution environment of FIG. 2, illustrating at least one embodiment of an information flow control scheme as disclosed herein.

Some embodiments of the illustrative platform 100 are modularized in the sense that at runtime, each of the running instances of the domains defined by the domain specifications 142, as well as the components of the trusted computing base 130, 140, 160, are both memory-isolated (e.g., data separation) and process-isolated (e.g., information flow control) from one another. To do this, as illustrated by FIG. 3, at installation time, the shared services 220, shared security services 250, domains 260, 270, and the virtualization service 212 are each allocated and assigned to their own address space in physical memory (e.g., block storage). Further, as illustrated by FIG. 4 and described below, only well-defined (e.g., by static firmware-enforced or physical hardware restrictions) communication channels exist between the modules 122 and the virtualization service 212, so that module communications can be tightly controlled according to the requirements of the current configuration of the computing device 100. As such, in some embodiments, the modular, virtualized architecture described herein represents an application of certain aspects of the MILS architecture mentioned above.

The illustrative data storage 164 is embodied as persistent physical storage, e.g. as a block device, which can read and write data in blocks having a fixed or nominal size (e.g., 512 bytes or a multiple thereof). As such, the data storage 164 may include one or more hard drives, optical drives (e.g., CD- or DVD-ROM), compact flash memory (e.g., memory sticks or memory cards), and/or other such devices.

In some embodiments, the integrity parameters 166 used by the secure boot logic 118 and/or other modules 122 are stored, at least temporarily, in the data storage 164. In some embodiments, portions of the security keys 120, the virtualization service 160 and/or the modules 122 may reside at least temporarily in the data storage 164, as well. Portions of the security keys 120, any of the modules 122, the virtualization service 160, and/or the integrity parameters 166 may be copied to the memory 112 during operation of the computing device 100, for faster processing or other reasons.

As noted above, the communication subsystem 158 may communicatively couple the computing device 100 to other computing devices and/or systems by, for example, a cellular network, a local area network, wide area network (e.g., Wi-Fi), personal cloud, virtual personal network (e.g., VPN), enterprise cloud, public cloud, and/or public network such as the Internet. For instance, the policy arbitration subsystem 136 may be used in the context of "cloud" virtualized services, in some embodiments. The communication subsystem 158 may, alternatively or in addition, enable shorter-range wireless communications between the computing device 100 and other computing devices, using, for example, Near Field Communication (NFC) technology. Accordingly, the communication subsystem 158 may include one or more wired and/or wireless network interface subsystems, cards, adapters, or other devices, as may be needed pursuant to the specifications and/or design of the particular computing system 100. In some embodiments, the communication subsystem 158 includes one or more telephony subsystems, which enable the computing device/platform 100 to provide telecommunications services (e.g., via a baseband processor). The telephony subsystem(s) generally include a longer-range wireless transceiver, such as a radio frequency (RF) transceiver, and other associated hardware (e.g., amplifiers, etc.). To provide voice communication services, the telephony subsystem may include an audio subsystem, which may include, for example, an audio CODEC, one or more microphones, and one or more speakers and headphone jacks. In some embodiments, other wireless communication subsystems (e.g., Ethernet, BLUETOOTH, wireless LAN (WLAN), etc.) and/or other services (e.g., GPS) may interface with, e.g., the baseband processor alternatively or in addition to the applications processor.

The computing device 100 may include other components, sub-components, and devices not illustrated in FIG. 1 for clarity of the description. In general, the components of the computing device 100 are communicatively coupled as shown in FIG. 1 by electronic signal paths, which may be embodied as any type of wired or wireless signal paths capable of facilitating communication between the respective devices and components.

The software module management service(s) 168 may include, for example, third-party platform management services (e.g., MDM services) or similar services that may be in communication with the computing device 100 over a network or a variety of different types of networks and communication media, via the communication subsystem 158. Such services 168 may be used to, for example, develop, manage, and implement security policies for the computing device 100, such as enterprise security policies or mobile device BYOD (bring your own device) policies.

Figure 2:
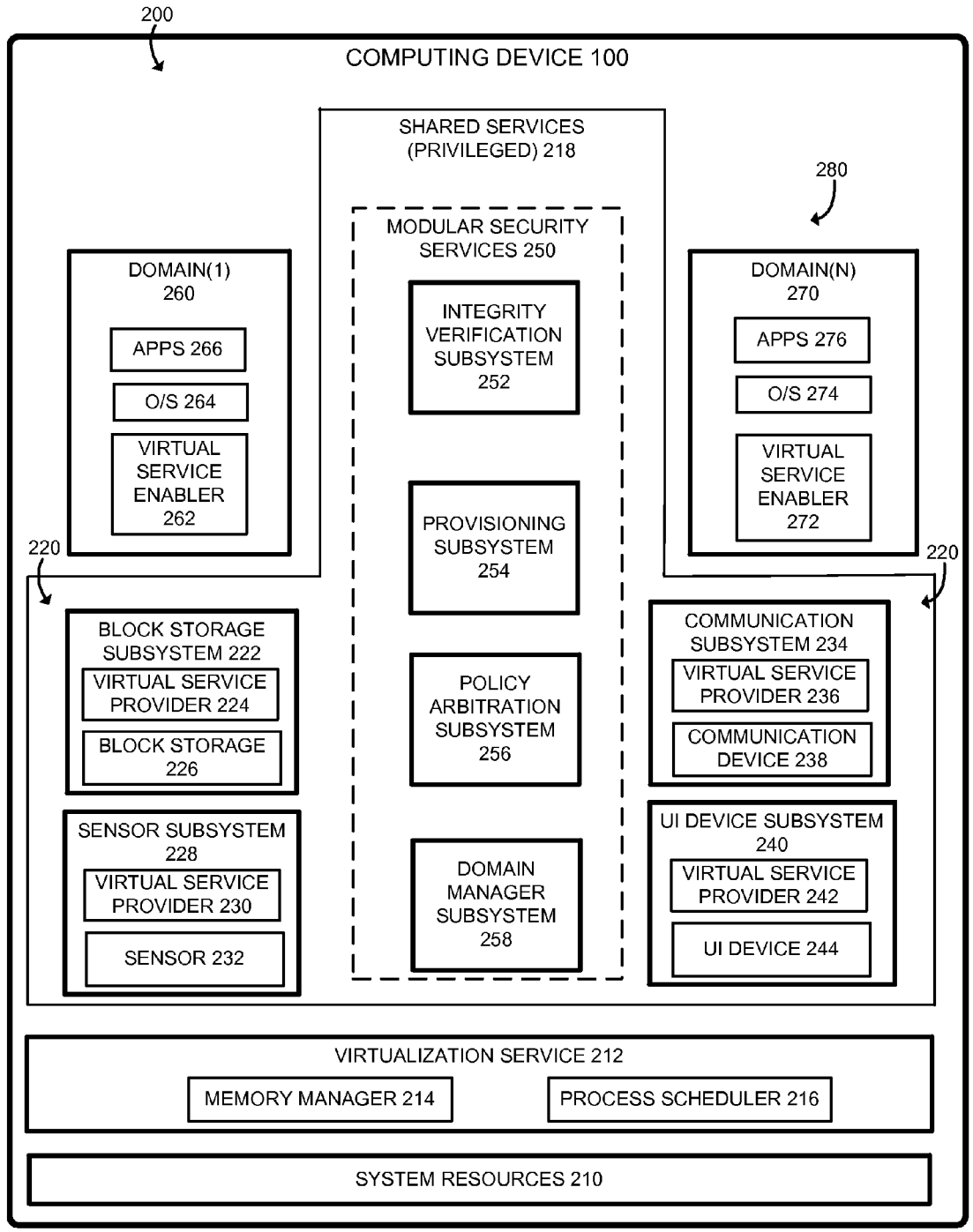
FIG. 2 is a simplified module diagram of at least one embodiment of a virtualized execution environment of the computing device of FIG. 1.

Referring now to FIG. 2, an embodiment of a modular, virtualized execution environment 200 that may be established on the computing device 100 is shown. At runtime, an executing instance of the virtualization service 212 interfaces with the system resources 210 (e.g., processor(s) 110, memory 112, I/O subsystem 114, and/or devices 116, 150, 152, 154, 156, 158, 164) through one or more submodules or subprocesses referred to herein as a memory manager 214 and a process scheduler 216 (which are also part of the trusted computing base). The memory manager 214 allocates virtual memory to each of the executing instances of the domains 260, 270 and shared services 218 that corresponds to their respective assigned physical memory (e.g., trusted protected memory 124), so as to implement and maintain the memory isolation technology described herein. The individual instances of the domains 260, 270 and shared services 218, and/or individual executing components thereof, may be referred to herein as "components" 280 for ease of discussion. The process scheduler 216 schedules and regulates communications between the components 280 and the virtualization service 212 over the well-defined communication channels as described herein, so as to implement and maintain the process isolation technology described herein. Using these technologies, the virtualization service 212 in conjunction with the shared services 218 controls the use and sharing of the various system resources 210 by the domains 260, 270, according to the security policies or requirements of the computing device 100. For instance, the trusted computing base 212, 218 can mediate software module communications so that the system resources 210 may each be accessed and used by only one of the domains 260, 270 at any given time. As an example, if the user of the computing device 100 is operating in an "enterprise" user domain and the user is a lawyer recording a deposition or a police officer videotaping a crime scene, the trusted computing base 212, 218 can ensure that, while the enterprise domain is using the device's camera, the camera cannot be accessed by the user's "personal" user domain, e.g., to take pictures or video.

Virtualized software services may be provided by any virtual service provider 224, 230, 236, 242, such as those to which the policy arbitration subsystem 256 can control access, including local software or hardware services (e.g., encryption services, network access, touchscreen display, audio input or output, etc.). At runtime, the virtualization service 212 communicates with the virtual service provider modules 224, 230, 236, 242 that are embedded in the shared services 220, and the virtual service enabler modules 262, 272 that are embedded in the domains 260, 270, respectively. The virtual service providers 224, 230, 236, 242 translate and map the virtualized operations of their respective shared service 220 to its physical counterparts, in order to provide access to a corresponding system resource 210 to, e.g., a domain 260, 270. Similarly, the virtual service enablers 262, 272 translate and map the virtualized operations of their respective domains 260, 270, to enable the domains 260, 270 to utilize (or "consume") system resources to which access is provided by the service providers 224, 230, 236, 242. Together, the virtualization service 212, the modularized virtual service providers 224, 230, 236, 242, and the modularized virtual service enablers 262, 272 provide a level of abstraction between the components 280 (e.g., each of the domains 260, 270 and the shared services 218) and the system resources 210. In other words, the virtualization service 212, the virtual service providers 230, 242, and the virtual service enablers 262, 272 provide (e.g., hardware) abstractions of some or all of the system resources 210, for each of the domains 260, 270 and the shared services 218. As shown by FIG. 4 and described in more detail below, the policy arbitration subsystem 256, alone or in conjunction with other modular security services 250, oversees the communications between the virtual service providers 230, 242, the virtual service enablers 262, 272, and the system resources 210 through the virtualization service 212.

In the example execution environment of FIG. 2, the trusted computing base, which generally operates in the privileged mode of the computing device 100, includes the executing instance of the virtualization service 212 and the executing instances of the shared services 218. In some embodiments, the privileged shared services 218 are implemented as middleware that interfaces with the virtualization service 212 to control and manage the execution of the various domains 260, 270. The shared services 218 include the executing instances of the modular shared security services 250 and the other shared services 220.

In the illustration of FIG. 2, the other shared services 220 include executing instances of a block storage subsystem 222, a sensor subsystem 228, a communication subsystem 234, and a user interface device subsystem 240. Other system services, such as audit services, encryption services, and/or many others, may be similarly modularized and virtualized, although not specifically shown. The illustrative shared services 218 are both memory-isolated and process-isolated from the domains (which, as illustrated, include at least a domain(1) 260 and a domain(N) 270). Additionally, the domains 260, 270 are both memory-isolated and process-isolated from each other and from the executing instances of the components 212, 218 of the trusted computing base. As such, the illustrative domains 260, 270 are independently executable and independently controllable by the trusted computing base 212, 218 or more specifically, by the virtualization service 212 interacting with the share security services 250 and with the other shared services 220. While only two domains are shown in the illustration, it should be understood that the computing device 100 may support any number ("N") of domains 260, 270 according to the requirements of a particular design of the computing device 100.

The illustrative security services 250 operate independently but in conjunction with one another and with the other shared services 220 and the virtualization service 212, to provide security features for the various domains 260, 270 running on the computing device 100. For instance, the integrity verification subsystem 252 may be called upon by the virtualization service 212 to check the integrity of a module or component of the computing device 100, e.g., at load time or at run time, and/or in response to a triggering event. An illustrative example of the integrity verification subsystem 252 is described in the aforementioned Oberg et al., U.S. patent application Ser. No. 13/872,865.

The illustrative provisioning subsystem 254 represents an executing instance of the provisioning subsystem 134, which defines, verifies, and maintains the component configuration for the device and each of the individual domains 260, 270. An illustrative example of the provisioning subsystem 254 is described in more detail in the aforementioned related application, Oberg et al., U.S. application Ser. No. 14/051,923.

The illustrative policy arbitration subsystem 256 represents an executing instance of the policy arbitration subsystem 136, which defines the protocols for, and in operation (256), regulates the electronic communications between the domains 260, 270 and the virtualization service 212. The policy arbitration subsystem 256, alone or in combination with one or more of the shared services 218, mediates these communications in accordance with security policies that may be specifically applicable to the individual domains 260, 270. An illustrative example of the policy arbitration subsystem 256 is described in more detail in the aforementioned related application, Forsberg et al., U.S. application Ser. No. 14/052,080.

As described in more detail below with reference to FIGS. 5-10, the illustrative domain manager subsystem 258 represents an executing instance of the domain manager subsystem 138, which defines rules and specifications for, and in operation (258) controls and manages, the activation and deactivation of the domains 260, 270 globally, e.g., at the computing device level. The domain manager subsystem 258 can, for example, switch operation of the computing device 100 from a highly sensitive domain (e.g., an enterprise domain) to a less-sensitive domain (e.g., a personal/social use domain), or vice versa, in response to a triggering event (e.g., dynamically, or in "real time"). Such a triggering event may include, for example, the receipt of user input such as tactile or speech input, a gesture, a specific software command, a user name and password, etc. The detection of certain inputs from one or more of the sensors 152 may also act as a triggering event. For example, if the computing device 100 detects, based on sensor data, that the user has entered a highly secure geographic area (such as a corporate office or a research facility), the domain manager subsystem 258 may autonomously (e.g., without requiring any user input) disable the user's access to any less-secure domains and only permit the user to access a highly secure domain on the computing device 100.

The domain manager subsystem 258 regulates the activation and deactivation of the domains 260, 270 in accordance with the applicable domain and/or device policies. In response to the activation or deactivation of a domain by the domain manager subsystem 258, access may be restricted to particular hardware components by specific domains 260, 270 to deny an "anti-purpose" of the system or an activated domain. In particular, access by a domain 260, 270 to device drivers that control hardware components that are capable of capturing personal or confidential information (like the camera, phone, GPS, and microphone) may be selectively restricted. In this way, data can be prevented from leaking from highly secure to less secure domains, and access to specific system resources can be controlled based on a policy or in response to "real-time" information, such as the current geographic location of the computing device 100, the current time of day, and/or other aspects of the current context of the computing device 100 that may be detected, for example, by sensors 152.

In addition, communication channels may be controlled in response to the activation or deactivation of a domain, to provide for the downgrading or filtering of information on such channels to different domains. As an example, if a security-vetted domain is activated, the security-vetted domain may be permitted to receive highly accurate geographic location values from a GPS, but other un-vetted domains may be only permitted to receive rough approximations of the same geographic information.

The other shared services 220 communicate with the virtualization service 212 through a respective virtual service provider 224, 230, 236, 242 to provide their respective hardware abstractions in a modular way. For instance, the block storage subsystem 222 virtualizes the I/O communications with block storage devices 226 (such as the firmware 116 or data storage 164). The block storage subsystem 222 thereby acts as a virtual device driver service that can be called upon by other modules of the trusted computing base or by the domains 260, 270, through the virtualization service 212, to move data out of block storage and into random access memory or vice versa. As an example, the integrity verification subsystem 252 may, through the virtualization service 212, communicate with the block storage subsystem 222 to obtain one or more of the integrity parameters 166.

The sensor subsystem 228, the communication subsystem 234 and the user interface device subsystem 240 operate similarly, in that they provide access to their respective system resources 226, 232, 238, 244 through modularized abstractions (e.g., virtual drivers). For example, the domain manager subsystem 258 may obtain sensor data from the sensor subsystem 228 through its interface with the virtualization service 212 and the virtual service provider 230. As another example, the integrity verification subsystem 252 may send integrity data (e.g., an indication of whether a particular software module 122/280 passed or failed an integrity check) to a mobile device management system by interfacing with the virtualization service 212 and the virtual service provider 236. Through this modularization of the system architecture and the isolation techniques described herein, embodiments of the computing device 100 can confine security issues to the components 280 and/or system resources 210 that may be affected.

In the illustrative execution environment 200, the domains 260, 270 are embodied as user domains that execute as "guests" of the virtualization service 212. That is, the domains 260, 270 execute in a lower-privileged, non-privileged, or non-root mode. As a result, the domains 260, 270 are lesser-privileged execution environments than that provided by the higher-privileged virtualization service 212. The operating systems 264, 274 and software applications 266, 276 executing in each of the domains 260, 270 may be the same or different. For instance, in some embodiments, the domain 260 may execute the ANDROID operating system while the domain 270 may execute the QNX operating system, or the domains 260, 270 may execute different versions of the same operating system. As another example, the domain 260 may execute an e-mail program and a web browser, while the domain 270 may execute an electronic medical records system but not e-mail or web browser applications.

Referring now to FIG. 3, an embodiment of the memory isolation features of the illustrative platform 100 is shown. The computing device 100 includes physical memory 300 (e.g., trusted protected memory 124) which is abstracted to virtual memory 320 by the virtualization service 160. The physical memory 300 includes a number of physical address spaces 310, 312, 314, 316. When the physical memory resources are virtualized by the virtualization service 212 (in conjunction with a modular shared service 220, in some embodiments), the components 280 are each mapped to separate, isolated portions of the physical memory 300. The assignment of physical memory address spaces to components 280 (e.g., shared services 220, security services 250, domains 260, 270) and the assignment of security labels to memory addresses may be performed at the time that the computing device 100 is created and provisioned (e.g., by an original equipment manufacturer or OEM), for example. In some embodiments, unique security labels may be associated with each of the memory addresses to facilitate the security features provided by the security services 250. For example, the policy arbitration subsystem 256 may use such security labels to determine whether to permit a domain 260, 270 to perform a read or write memory access to a portion of the physical memory 300.

Referring now to FIG. 4, a simplified example of the process isolation or "information flow" isolation features of the illustrative platform 100 is shown. FIG. 4 illustrates a MILS-based embodiment comprising architectural components (e.g., components 210, 212, 222, 228, 234, 240, 260, 270), and explicitly defined interactions between the components (e.g., arrows 410, 412, 414, 416, 418, 420, 422, 424, 426, 428), where the presence or absence of an arrow is significant (e.g., the absence of an arrow indicates the absence of a communication channel). The bidirectional arrows 410, 412, 414, 416, 418, 420, 422, 424, 426, 428 each represent a well-defined communication channel that may be unidirectional for some domains 260, 270 or shared services 218 and bidirectional for other domains 260, 270 or shared services 218, depending upon the applicable security policy. As used herein, "well-defined" may refer to a communication channel (e.g., any suitable type of wired or wireless signal path) that only has two possible endpoints (e.g., a source and destination or vice versa) and cannot be modified by any domains 260, 270 or shared services 220. For instance, in some embodiments, hardware restrictions may be provided by a computing device's original hardware design (e.g., an I2C bus layout or intra-bus connects within an SoC). In the context of software virtualization of a communication bus, a privileged controller (e.g., a hypervisor supervising single-service access to an approved hardware resource) can restrict access to a communication channel by different "users" (e.g., domains 260, services 218), rather than designing the device hardware to include additional buses for each special purpose channel (e.g., 1x physical bus per virtualized service). In other words, the well-defined communication channels may be embodied as, for example, hypervisor-supervised secure multiplexed communications over a single bus/physical transport or as multiple independent buses that each ensure singleton security.

Thus, in the embodiment of FIG. 4, each of the domains 260, 270 can only access the system resources 210 through the respective defined communication channels 410, 412, 414, 416, 418, 420, 422, 424, 426, 428 and can only do so through the virtualization service 212 and shared services 218. However, the arrangement shown in FIG. 4 is by no means the only possible arrangement of communication channels. For example, in other embodiments, the domains 260, 270 may communicate with the shared services 220 through the policy arbitration subsystem 256 (e.g., communications may be monitored by the policy arbitration subsystem 256 for policy compliance). Further, it should be understood that similar communication channels may exist between components of the modular security services 250 and other shared services 218, even though not explicitly shown in the drawings.

Unique security labels may be programmatically associated with each of the well-defined communication channels so that the components of the trusted computing base can monitor communications that are sent between the different components 280 (e.g., domains 260, 270 and shared services 218) of the computing device 100. For instance, the policy arbitration subsystem 256 can mediate the communications that occur over the channels 410, 412, 414, 416, 418, 420, 422, 424, 426, 428 according to applicable policies, in accordance with the requirements of the computing device 100. The assignment of communication channels to the components 280 and the assignment of security labels to communication channels may be performed at the time that the computing device 100 is designed and/or provisioned (e.g., by an original equipment manufacturer or OEM). For example, the communication channels may be established at or around the time that the memory partitions for the domains 260, 270 and shared services 218 are created.

Figure 5:
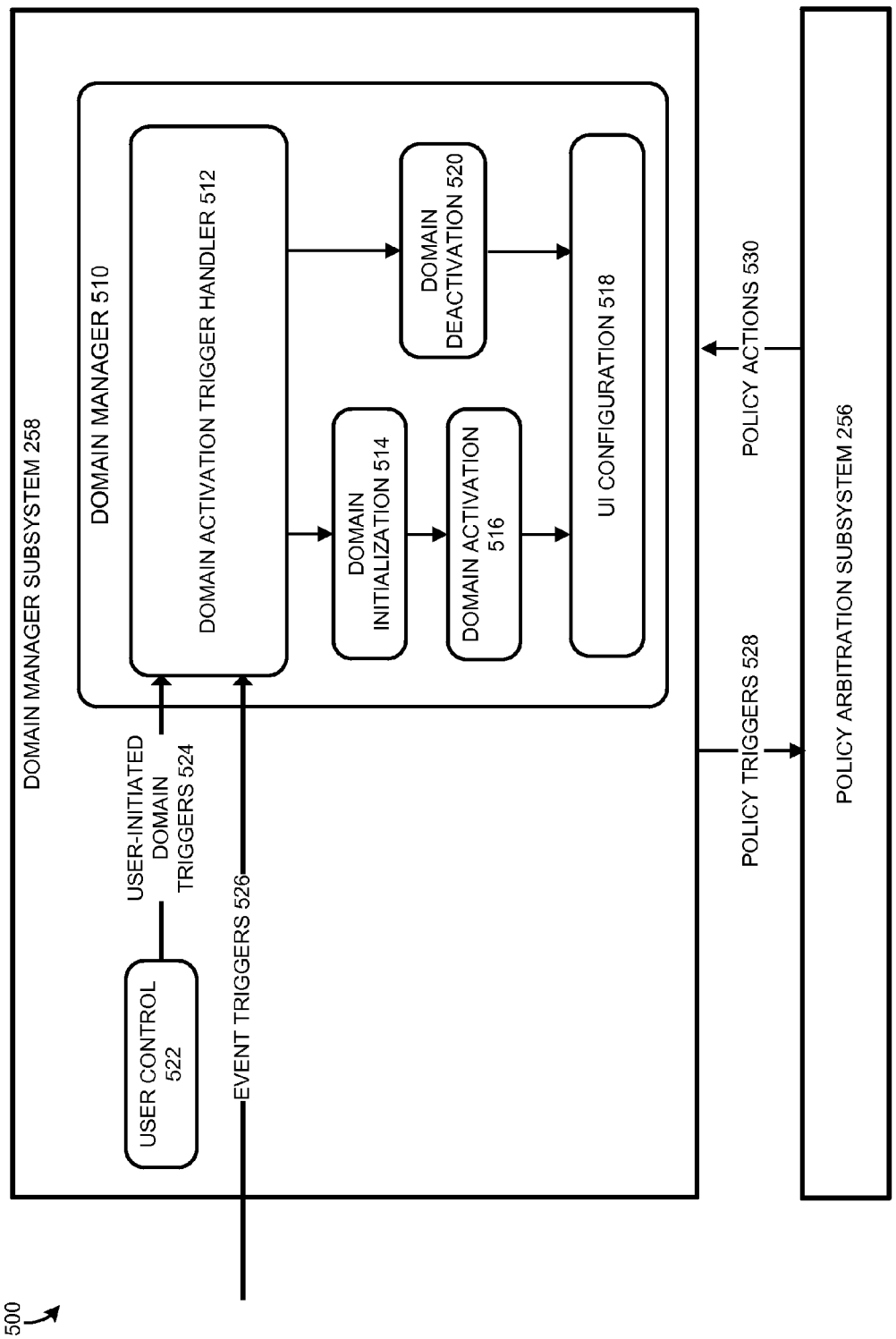
FIG. 5 is a simplified module diagram of at least one embodiment of a domain manager subsystem as disclosed herein.

Referring now to FIG. 5, the illustrative domain manager subsystem 258 is embodied as a number of computerized components or modules that, in some embodiments, may exist within an isolated domain (e.g., APIs, physics-based controls, firmware, etc.) that can dynamically and selectively activate and deactivate domains on the computing device 100, as described in more detail below. As used herein, "activate" may refer to, among other things, the process of launching a domain for execution by the computing device 100, whether as an "active" domain (e.g., where the domain is running in the foreground, enabling user interaction with the domain) or another type of "executing" domain (e.g., where the domain is running as a background process, where user interaction with the domain is not enabled). Similarly, as used herein, "deactivate" may refer to, among other things, the process of temporarily "freezing" execution of a domain or "closing" a domain by ending its execution (whether foreground or background). Where a domain is temporarily frozen by the domain manager subsystem 258 (e.g., as a result of the policy implications of activating another domain), such freezing may be accomplished by, for example, transferring the execution of the domain to a passive or background mode in which the domain is temporarily denied privileges to access and use one or more of the shared system resources 210 in accordance with the applicable policy. Such freezing or deactivating operations may be accomplished by, for example, the domain manager subsystem 258 in communication with the virtualization service 212 or by the domain manager subsystem 258 in communication with one or more of the shared services 218 (e.g., via the policy arbitration subsystem 256).

The illustrative domain manager subsystem 258 is embodied as a domain manager 510, which includes a domain activation trigger handler 512, a domain initialization module 514, a domain activation module 516, a user interface ("UI") configuration module 518, and a domain deactivation module 520. The domain activation trigger handler 512 communicates with a user control 522 to receive the user-initiated domain triggers 524. The domain activation trigger handler 512 also communicates with, e.g., shared services 218 (such as virtual service providers 224, 230, 236, 242) to receive the event triggers 526. Further, the domain manager subsystem 258 communicates with the policy arbitration subsystem 256 to receive policy actions 530 in response to policy triggers 528, which may be initiated by the domain manager 510 (e.g., as a result of the activation, initialization, or deactivation of a domain).

The domain activation trigger handler 512 applies policy rules to the user-initiated domain triggers 524 and event triggers 526, to determine whether to activate or deactivate any domains in response to the triggers 524, 526, and to determine which, if any, shared system resources 210 need to be controlled in response to the activation or deactivation, as the case may be, of a domain. In the illustrative embodiment, such policy rules are supplied to the domain activation trigger handler 512 by the policy arbitration subsystem 256 in the form of policy actions 530. Some techniques for determining policy actions 530 are described in more detail in the aforementioned Forsberg et al., U.S. application Ser. No. 14/052,080.

If a domain is to be activated in response to a trigger 524, 526, domain initialization 514 and domain activation 516 modules initialize and activate the domain in accordance with the applicable policy of the domain which, in some cases, is combined and reconciled with the policies of other domains on the computing device 100 in a least restrictive conforming way. As described in the aforementioned Forsberg et al., U.S. application Ser. No. 14/052,080, "least restrictive conforming" may refer to, among other things, a policy that is determined by a process of synthesizing the policies of multiple domains of a computing device such that each domain's respective policy is satisfied in a least restrictive way. To do this, each domain's policy may include a number of different implementation options (e.g., to achieve a particular purpose and prevent an anti-purpose). The different implementation options of the policies may be dynamically selected and implemented, depending on the requirements of other domain policies and/or the current operating context of the computing device 100. If a domain is to be deactivated in response to a trigger 524, 526, a domain deactivation module 520 deactivates the domain similarly (in accordance with the applicable policy of the domain which, in some cases, is combined and reconciled with the policies of other domains on the computing device 100 in a least restrictive conforming way).

The UI configuration module 518 updates a user interface of the computing device 100 (e.g., a visual display screen) to communicate to the user information relating to domain activations as they occur. Alternatively or in addition, the UI configuration module 518 may issue audio or tactile notifications, or utilize any suitable means of interacting with a user of the computing device 100 to communicate to the user information relating to the current status of the device in terms of activated and/or deactivated domains, the occurrence of a switch from one activated domain to another, and/or other domain-related information. In some embodiments, a colored border or frame may appear on a display screen of the computing device 100, or the "background" of the visual display may change, to indicate that a domain change has occurred or that a certain domain is active. For example, a red border may indicate that a highly restrictive domain is active, while a green or blue border may indicate that a less restrictive domain is active (where "highly restrictive" or "less restrictive") may indicate the degree to which other domains are prevented from using shared system resources 210 while the domain is running). Some examples of domains that may be considered highly restrictive include mobile virtual appliance applications that are specifically designed to control the operation of or communicate with "smart homes" (e.g., home security systems, consumer appliances, climate control systems, etc.), vehicles, machines, and/or electromechanical devices such as medical devices, physiological monitors, and healthcare equipment, or applications that require access to sensitive information, such as financial, medical, and health-related applications, or domains that are designed for use by children or young adults. Some examples of domains that may be considered less restrictive in the sense that the domains may not require the use of shared system resources 210 to be restricted for other domains while the domain is active include, for example, general-purpose domains and domains that are used primarily for browsing or reading (e.g., Internet surfing, e-readers, etc.), general social media communications, or entertainment.

Figure 9:
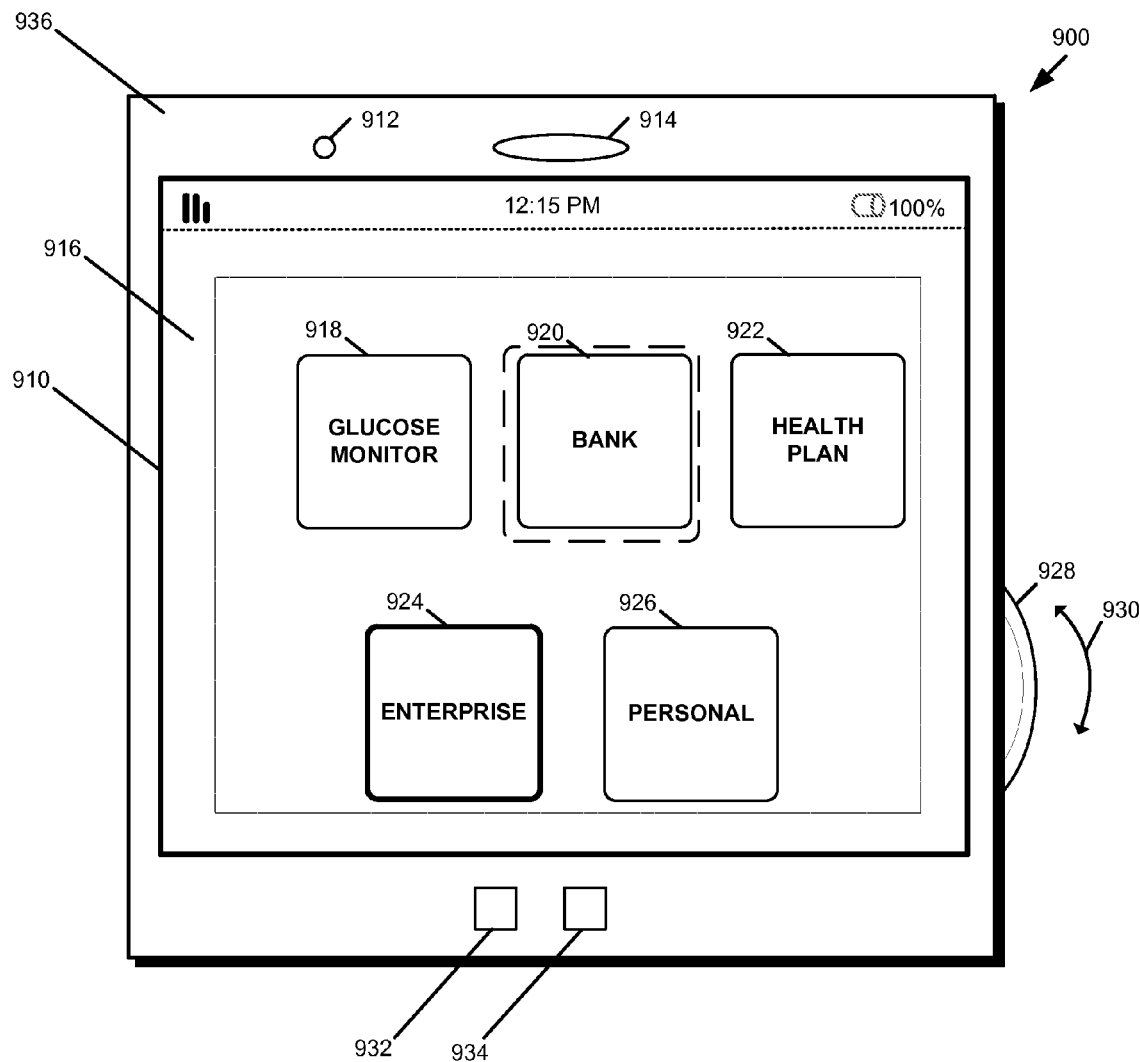
FIG. 9 is a simplified front elevational view of at least one embodiment of a computing device, showing an exemplary display screen and a number of user-selectable elements.
Figure 10:
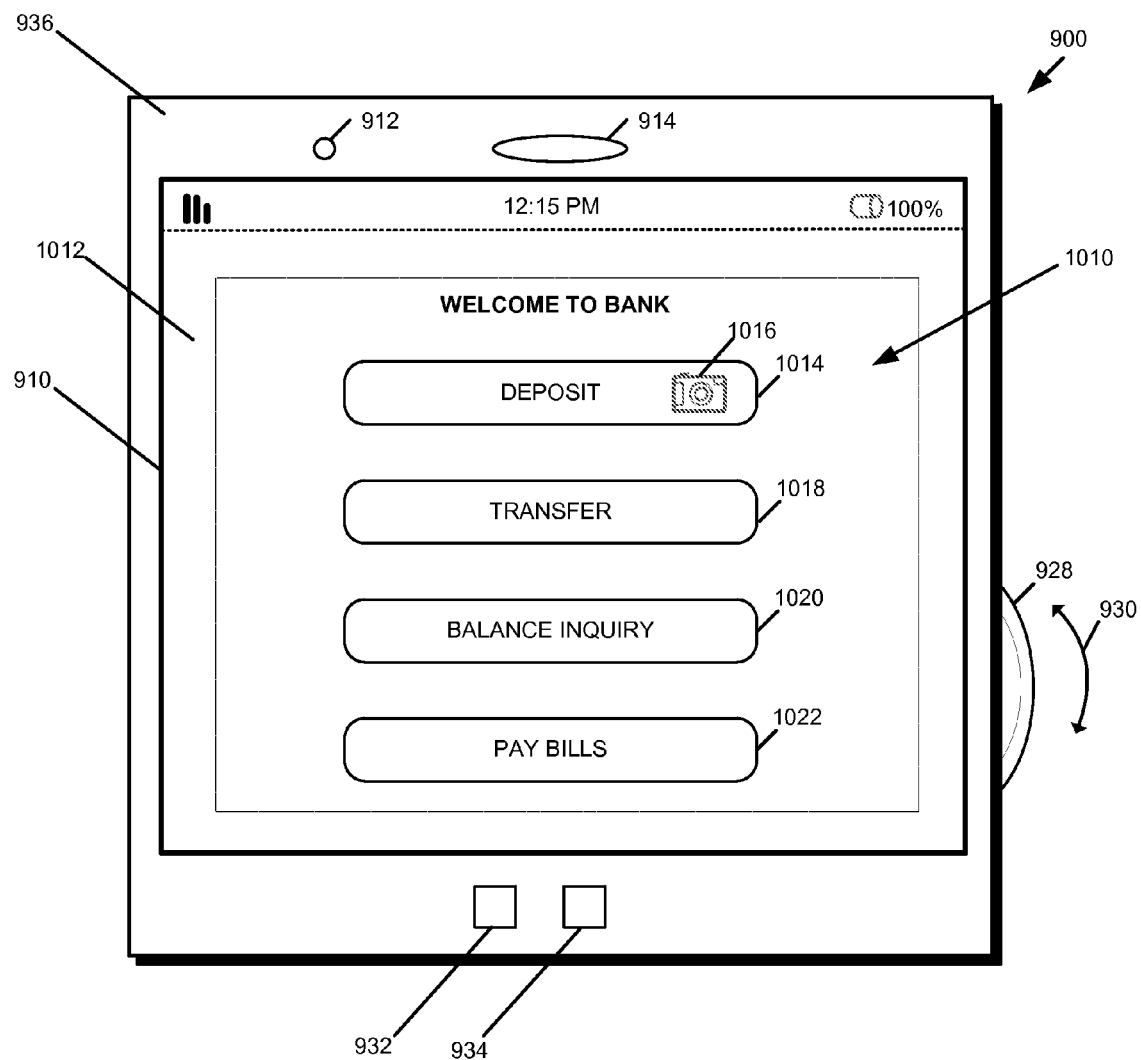
FIG. 10 is a simplified front elevational view similar to FIG. 9, showing an exemplary display screen for a domain and a number of user-selectable elements.

As noted above, such switches from one domain to another may be initiated by the user or by other events detected by the computing device 100. In the illustrative embodiment, a user control 522 (or a number of user controls 522) provide the mechanism by which the user may initiate a domain activation or deactivation. In general, the user control 522 provides a user-authenticated trust path interface in that signals received by the domain manager 510 from the user control 522 can be trusted as having been generated in response to input by an authorized user of the computing device and such that the signals generated in response to the user input can be trusted as not having been tampered with in an unauthorized way prior to receipt by the domain manager 510. As such, the user control 522 may be embodied as a virtual or physical user touch, tap, or gesture based control, such as a touchscreen graphical control or a physical push button, slide, dial, switch, etc., as a voice-based control (e.g., microphone), or image-based control (e.g., camera detecting facial characteristics, including human eye features and gaze). In some embodiments, software or firmware-based biometric authentication techniques, such as fingerprint recognition, face or iris recognition, or voice biometrics, may be used in combination with the user control 522 to establish user authentication. Well-defined communication channels as described above may be used to provide the trusted path from the user control 522 to the domain manager 510. Illustrative embodiments of the user control 522 are shown in FIGS. 9-10, described below.

Figure 6:
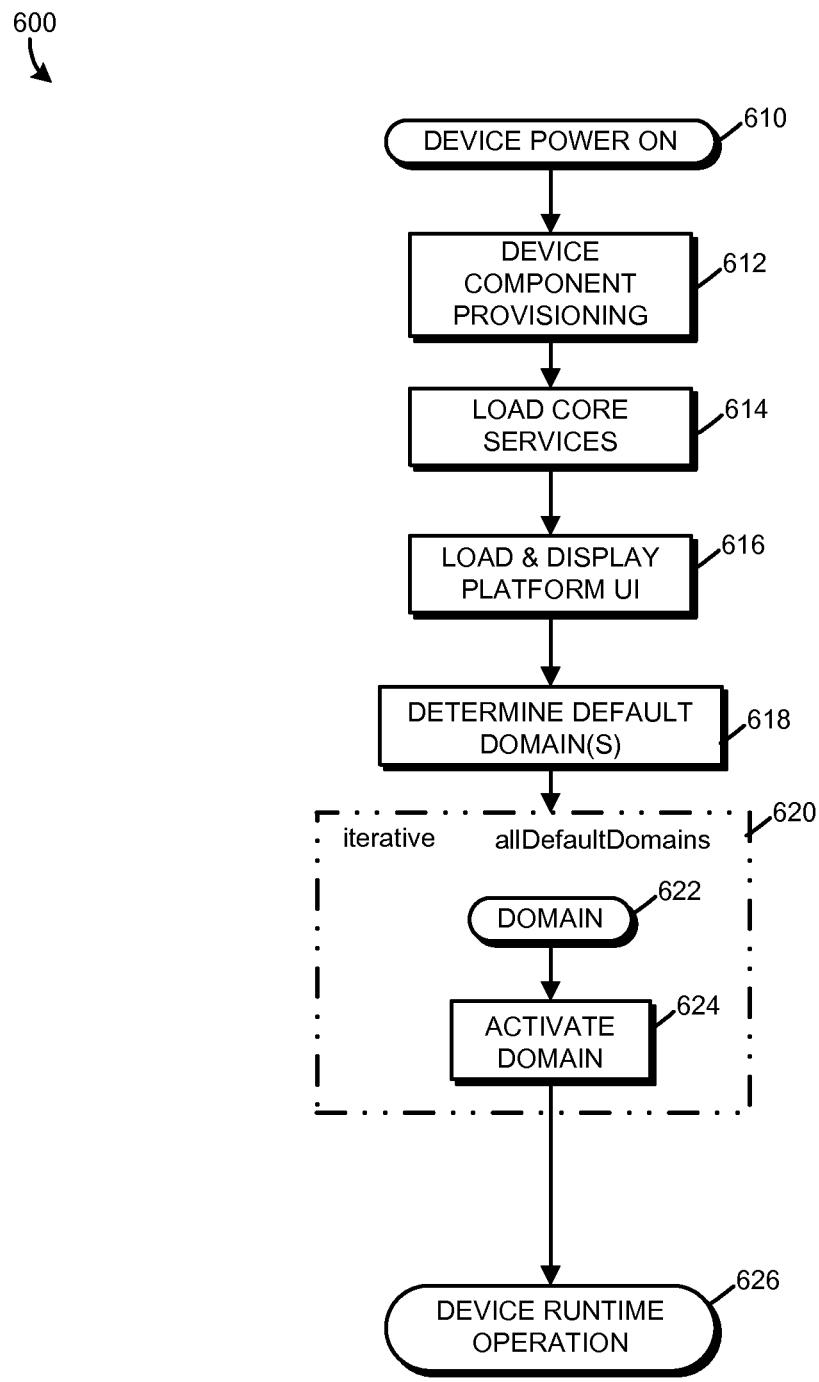
FIG. 6 is a simplified flow diagram of at least one embodiment of a method for starting operation of a computing device with multiple domains as disclosed herein.

Referring now to FIG. 6, an illustrative method 600 for starting a computing device 100 provisioned with one or more domains is shown. The method 600 may be embodied as computerized programs, routines, logic and/or instructions executed by the computing device 100 (by the domain manager 510, for example). At block 610, the method 600 is initiated by the power on of the device 100. At block 612, the trusted computing base of the device (e.g., the virtualization service 212 and/or one or more of the shared services 218) performs component-based provisioning to, for example, check and install any updates to the device 100, including any updates to the domains or their respective components. Some examples of mechanisms for provisioning the device 100 and/or its components are described in the aforementioned Forsberg et al., U.S. application Ser. No. 14/052,080 and the aforementioned Oberg et al., U.S. application Ser. No. 14/051,923.

At block 614, core services that are needed for the operation of the device 100 are loaded into memory (e.g., memory 112, 124). The core services that are loaded at block 614 may include, for example, one or more of the virtual service providers 224, 230, 236, 242 and/or one or more of the virtual service enablers 262, 272. For instance, if the device 100 is provisioned with a financial services domain, the financial services domain may require use of the device's camera (e.g., to photograph checks for deposit). As such, a virtual service provider for the access and use of the camera may be loaded at block 614.

Figure 7:
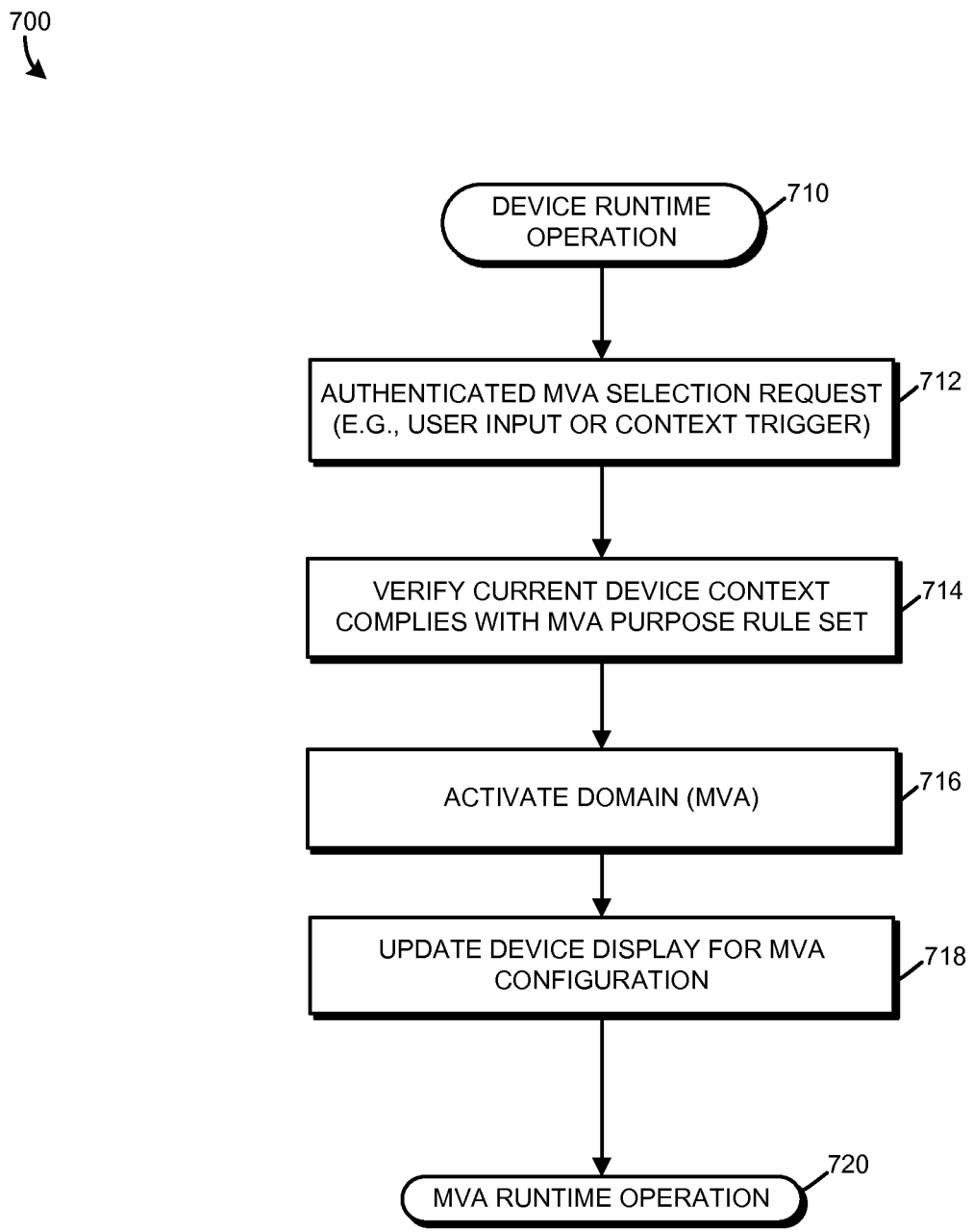
FIG. 7 is a simplified flow diagram of at least one embodiment of a method for activating a domain of a computing device as disclosed herein.
Figure 8:
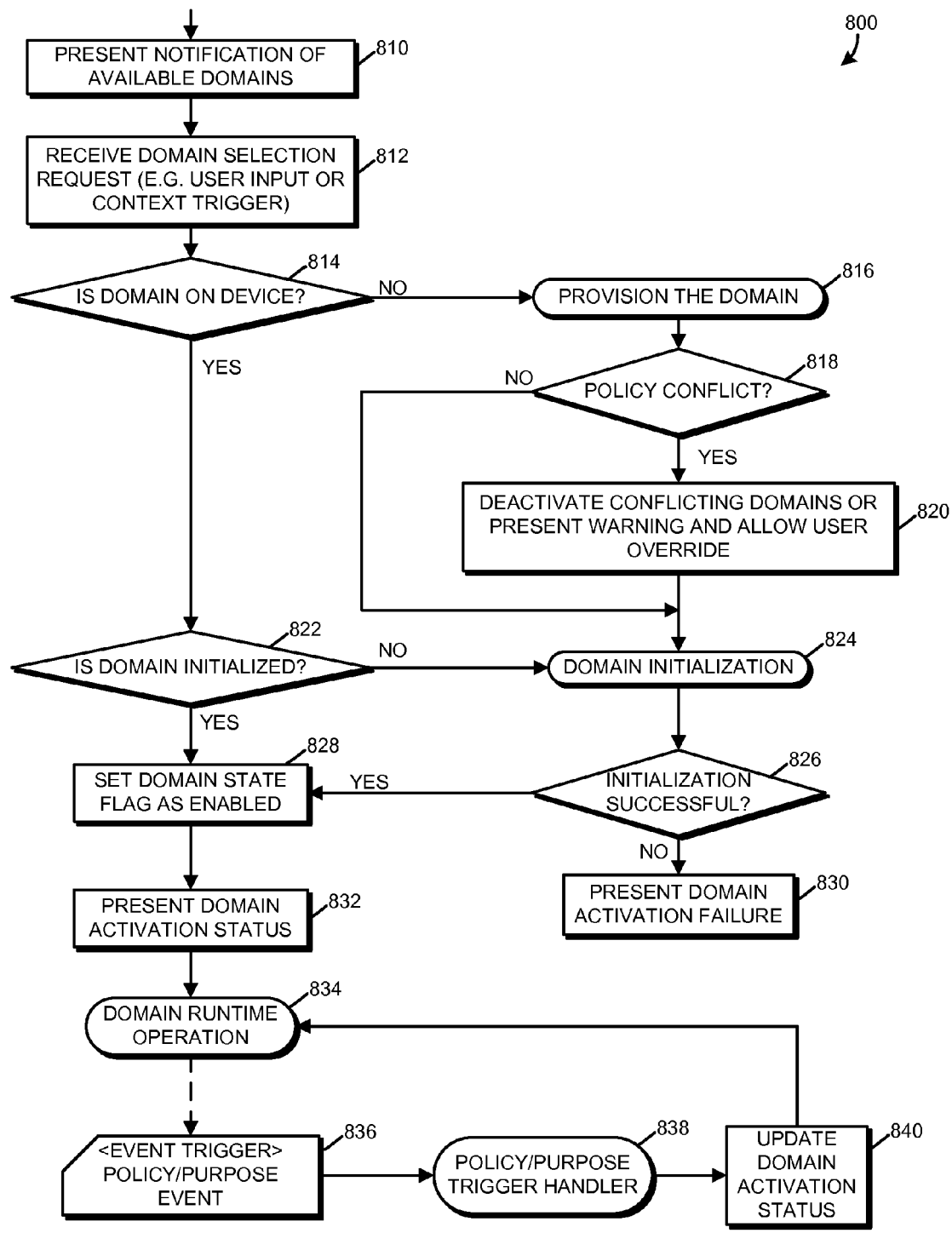
FIG. 8 is a simplified flow diagram of at least one embodiment of another method for activating a domain as disclosed herein.

At block 616, the device 100 loads the platform user interface into memory and displays the platform user interface on a visual display of the device 100. The platform user interface may display, for example, a splash screen with a logo, and/or a listing of the domains that have been provisioned on the device 100 (but which are not yet active). At block 618, the device 100 determines the "default" domains; that is, the domains that are to be activated automatically upon start-up of the device (e.g., in the absence of any triggers 524, 526 or policy actions 530 dictating otherwise). Once the default domains are determined, the device 100 enters an iterative loop 620 to activate each of the identified default domains (blocks 622, 624). While illustrated as a loop, it should be understood that the activation of domains may occur concurrently or in parallel rather than sequentially, in some cases. Some examples of procedures that may be executed by the device 100 for activating the domains are illustrated in FIGS. 7-8, described below. Following activation of the default domains, the device 100 begins or resumes normal runtime operation at block 626.

Referring now to FIG. 7, an illustrative method 700 for activating a domain, or more specifically, a domain that implements a mobile virtual appliance on a general purpose or multi-purpose device is shown. The method 700 may be embodied as computerized programs, routines, logic and/or instructions executed by the computing device 100 (by the domain manager 510, for example). At block 710, the method 700 is initiated during device startup as described above (e.g., in loop 620), or during normal runtime operation of the device 100 (e.g., by the detection of a trigger 524, 526). At block 712, the device 100 determines that the trigger for domain activation includes a mobile virtual appliance ("MVA") activation request that has been authenticated. That is, the device 100 has received a request to activate a "mobile virtual appliance" and the source of the request (e.g., a user or a sensing device) has been authenticated. Such authentication may be performed by, for example, the integrity verification subsystem 252. In general, a mobile virtual appliance may refer to a type of domain that is configured to perform a single, dedicated function or set of functions that are related to a single purpose. Some examples of mobile virtual appliances may include device control applications, such as medical device control applications and/or others. At block 714, the device 100 reviews the rule set or policy associated with the mobile virtual appliance and verifies that the current operating context of the device 100 complies with the MVA rule set/policy. As an example, an MVA rule set for a medical device MVA may stipulate that no other domain can have network connectivity while the medical device MVA is running. As another example, an MVA rule set for a bank MVA may require that no other domain can use the device's camera while the bank MVA is in use, or at least while the "deposit" feature of the bank MVA is in use. If the device's current context violates the MVA's rule set, then appropriate actions are taken by the device 100 to conform the current operating context to the MVA's rule set. This may involve deactivating one or more other domains, partially or fully disabling certain shared system resources 210 for some domains, and/or enabling certain shared system resources 210 for exclusive use by the MVA, as described above.

At block 716, the selected/requested MVA is activated (assuming access and use of the shared system resources 210 is successfully configured and controlled as required by the MVA's rule set or policy). To do this, the device 100 may launch the MVA, e.g., in a similar manner to which software applications are typically launched or activated by an operating system. In some embodiments, the device 100 may perform policy provisioning on the MVA prior to its activation, as described below with reference to FIG. 8. At block 718, a visual display of the device 100 is updated (e.g., by changing a border or background color, etc., as described above), or some other action is generated by the device 100, to communicate the activation of the MVA to the user of the device 100. The device 100 continues normal runtime operation, now acting solely as the MVA however (and not as a general purpose device), at block 720. In this way, method 700 can effectively transform the general purpose or multi-purpose device 100 into a specific-purpose MVA, at least temporarily.

Referring now to FIG. 8, another illustrative method 800 for activating a domain is shown. The method 800 may be embodied as computerized programs, routines, logic and/or instructions executed by the computing device 100 (by the domain manager 510, for example). At block 810, the method 800 presents a notification of domains that are available for activation to the user (e.g., as a list displayed on a display screen of the computing device 100). In some embodiments, the available domains may include domains that are not yet provisioned on the computing device 100. For example, the method 800 may periodically "ping" or receive notifications from one or more cloud-based "app stores" or "app markets" as to new or updated domains that are available. At block 812, the device 100 receives a domain selection or request, which may take the form of, for example, a user-initiated domain trigger 524 or an event trigger 526. For instance, the user may select a domain from an app store, or a domain may be selected as a result of a context trigger, such as the detection by the device 100 of a wireless communication with another device (e.g., a WIFI communication from a medical device, a smart TV, or some other networked device).

At block 814, the method 800 determines whether the selected/requested domain is already provisioned (e.g., installed and configured for use in accordance with applicable policies) on the device 100. If the domain is not already provisioned on the device 100, policy provisioning and/or component purpose provisioning is performed at block 816. Some examples of techniques for policy provisioning and component purpose provisioning a domain on a device are described in the aforementioned Forsberg et al., U.S. application Ser. No. 14/052,080 and the aforementioned Oberg et al., U.S. application Ser. No. 14/051,923. For example, in some embodiments, the domain's policy(ies) and/or purpose(s) may be combined and reconciled with the policies and/or purpose(s) of other domains on the device 100, or with an existing device policy, as mentioned above. At block 818, the device 100 determines whether any of the selected/requested domain's policy(ies)

and/or purpose(s) conflict with the existing device policy(ies) and/or purpose(s), or with any of the policies/purposes of the other domains on the device 100. The domain's policy or purpose may conflict with another policy or purpose if, for example, both domains require exclusive access to a shared system resource 210 at the same time. If the provisioning 816 concludes that there are no policy or purpose conflicts, the method 800 proceeds to block 824. If the provisioning 816 concludes that the selected/requested domain's policy or purpose conflicts with one or more other policies or purposes governing the operation of the device 100, the method 800 may deactivate the domains having conflicting policies/purposes or allow the user (or another higher-privileged authority) to override the conflict (block 820) and continue with the domain initialization (block 824). In general, domain initialization involves executing procedures on the computing device 100 to load the domain into memory and make it available for execution.

If, at block 814, the domain is already provisioned on the device 100, the method 800 proceeds to block 822, where it determines whether the domain is already initialized. If the domain has not been initialized, initialization is performed at block 824 as described above. If the domain has already been initialized, or if initialization is determined successful (block 826), the device 100 sets a domain state flag to indicate that the domain is "enabled" (or activated) (block 828), updates the domain activation status on the user interface of the device 100 (block 832), and begins or continues normal runtime operation of the domain (block 834). If the domain initialization is not successful (e.g., if the domain is not successfully loaded due to an integrity check failure), the domain activation fails and a communication to that effect is generated at block 830.

During runtime operation of the domain (834), various event triggers 836 (e.g., policy triggers, purpose triggers, context triggers, etc.) may occur from time to time on the computing device 100. Such event triggers 836 may include user-initiated and/or system-detected events that implicate one or more of the domain or component policies or purposes that are currently active on the device 100. Such events may include, for example, connection of the device 100 to a certain wireless access point, location of the device in a geofenced area, or the sending of an electronic communication to a particular email address or to another device. A policy/purpose trigger handler 838 handles the event triggers 836 as described in the aforementioned Forsberg et al., U.S. application Ser. No. 14/052,080 and/or Oberg et al., U.S. application Ser. No. 14/051,923, for example. The handling of event triggers 836 may involve a change in the status of the domain activation. For example, an event trigger may implicate a policy or purpose that requires the domain's access or use of certain shared system resources or component resources to be modified, enabled, or disabled, in which case the necessary changes are implemented and the method 800 returns to block 834. While not specifically shown, it is of course possible that in some cases, an event trigger 836 may require the domain to be deactivated. In these cases, the domain is deactivated, the domain state flag is set to "disabled" (or deactivated), and the domain status is updated.

The foregoing methods are simplified for discussion purposes, but it should be understood that the device 100 may undertake any of the foregoing methods or processes (or blocks or steps thereof) concurrently or in parallel, e.g., for each of the executing domains 260, 270. For example, the device 100 may perform an analysis of any triggers 524, 526 that it receives from any or all of the domains 260, 270, in whatever order or sequence they may occur.

Example Usage Scenarios

Figure 11:
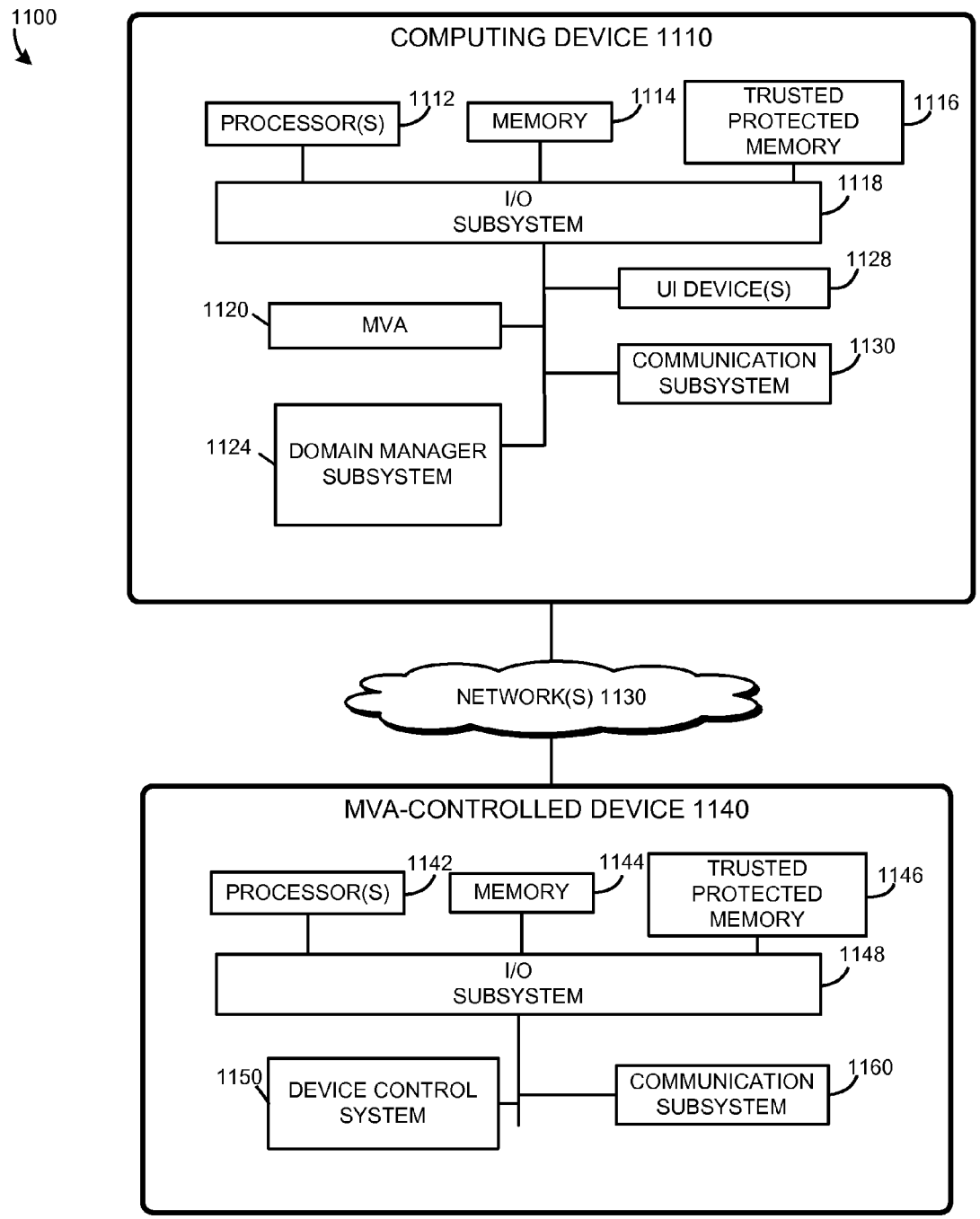
FIG. 11 is a simplified block diagram of at least one embodiment of a networked computing system, including a mobile virtual appliance and an MVA-controlled device as disclosed herein.

Referring now to FIGS. 9-11, embodiments of the above-described domain management techniques can provide finer-grained, context-aware control over the use of shared system resources in response to domain activations and deactivations, which has many potential applications. In FIGS. 9-10, a general purpose or multi-purpose mobile computing device 900 is embodied to include a housing 936 (made of a rigid or non-rigid material, e.g., plastic, metal, glass, or a combination thereof). The housing supports a display screen 910, a number of sensors 912, 914 (e.g., optical sensor, microphone, accelerometer, etc.), and a number of user controls 928, 932, 934. In FIG. 9, the display screen graphically displays a frame or border 916 and a number of user-selectable icons or tiles 918, 920, 922, 924, 926. Each of the icons or tiles 918, 920, 922, 924, 926 represents a domain that is available for use on the device, and can be selectively activated by the user or by an event trigger 526. The illustrative user control 928 is embodied as a rotatable member (e.g., a dial or wheel), which can be rotated in either a clockwise or counterclockwise direction, as indicated by the bidirectional arrow 930. The illustrative user controls 932, 934 are embodied as touch-sensitive buttons (e.g., push buttons). In some embodiments, the user control 928 is operable to switch between active domains. For example, if the "bank" domain 920 is activated, rotating the control 928 in a clockwise direction may operate to deactivate the bank domain 920 and activate the "health plan" domain 922. Along with the activation of the domain 922 and deactivation of the domain 920, such rotation of the control 928 also accomplishes the necessary changes to the access and use of shared system resources 210 in accordance with the applicable domain policies (e.g., the policy of the on-coming domain 922). The user controls 932, 934, in some embodiments, respectively enable navigation within an active domain and navigation out of an active domain back to the "home" screen (e.g., FIG. 9).

The frame or border 916 may be displayed in a specific color or pattern, for example, to indicate the status of the device 100 as having one or more particular domains active. Such display may be dynamically changed as the active domains change. Further, as shown in FIG. 9, the display of certain domains may be configured to indicate the status of the domain. For example, the display of the "enterprise" domain 924 may be emphasized to indicate that it is currently active, while the display of the "bank" domain 920 may be displayed with a contrasting-color border (represented by dashed lines) to indicate that it is not currently active, but is currently selected (e.g., by the wheel or dial 928).

As shown in FIG. 10, selection of the bank domain 920 (e.g., via the wheel or dial 928) results in the activation of the bank domain 920. Activation of the bank domain 920 transforms the multi-purpose device 900 into a specific-purpose device or mobile virtual appliance (MVA). That is, while the bank domain 920 is activated, the device 900 cannot be used for another purpose, e.g., to access one's health plan or personal domain. Of course, in some embodiments, portions of the device 900 may still be used for other, limited purposes, in accordance with the applicable policy. For example, the device 900's phone may continue to receive telephone calls if permitted by the MVA's policy. In accordance with the domain change, the frame or border 916 is changed to a different color or pattern 1012. Additionally, user-selectable graphical controls 1014, 1018, 1020, 1022 are presented for each of the various domain-specific functions of the bank domain 920. A camera icon 1016 is displayed in connection with the "deposit" feature 1014 to indicate that use of the device 900's camera is available when the "deposit" feature 1014 is activated, but not available for any of the other features 1018, 1020, 1022.

Referring now to FIG. 11, an illustrative computing system 1100 includes a mobile virtual appliance 1120 and domain manager subsystem 1122 embodied in a computing device 1110, and a device control system 1150 embodied in another device 1140. In the illustrative embodiment, the computing device 1110 is embodied as a general purpose or multi-purpose mobile computing device (such as a smartphone, tablet, wearable device, etc.), while the computing device 1140 is embodied as an "MVA-controlled device," e.g., another device that is not a general purpose or multi-purpose computing device. The devices 1110, 1140 are in communication with each other via one or more networks 1130. For example, the network(s) 1130 may communicatively couple the computing devices 1110, 1140 to each other and/or to other computing devices and/or systems by, for example, a cellular network, a local area network, wide area network, personal cloud, virtual personal network (VPN), enterprise cloud, public cloud, and/or public network such as the Internet, or by short-range wireless communication (e.g., Near Field Communication or NFC). The illustrative computing devices 1110, 1140 and the network 1130 are depicted in simplified form for ease of discussion. It should be understood that either or both of the computing devices 1110, 1140 may be configured in a similar manner to the computing device 100 and have one or more similar components thereto. For example, the computing device 1110 and/or the computing device 1140 may include all or a subset of the components of the computing device 100. In general, the components of the computing system 1100 having similar or identical names to components shown in FIG. 1 and/or described above may be embodied in a similar fashion to the corresponding components described above. As such, reference is made here to the foregoing description and such description is not repeated here.

The mobile virtual appliance 1120 is embodied as a specific-purpose domain that is configured specifically to control the operation of the MVA-controlled device 1140, as described above. For example, the MVA 1120 may be embodied as a user-level glucose monitor control application 918, such that when the MVA 1120 is activated on the (general purpose or multi-purpose) computing device 1110, the device 1110 is temporarily transformed into a glucose monitor control capable of interacting with the user only for the purpose of communicating with and controlling the operation of the MVA-controlled device 1140 (e.g., a glucose monitoring device). To do this, the domain manager subsystem 1122 implements the MVA rule set as described above to deactivate any other active domains while the MVA 1120 is activated, and enables exclusive access by the MVA 1120 to the communication subsystem 1130 and UI devices 1128, which effectuate communications between the user and with the device control system 1150. With assurance that the computing device 1110 is only operating as the MVA 1120 during the time that the MVA 1120 is active being provided by, e.g., a MILS-based architecture, the system 1100 allows for, among other things, validation of the MVA 1120 without requiring validation of the entire device 1110.

The domain manager systems disclosed herein are by no means limited to benefiting only mobile device applications. For instance, embodiments of the disclosed domain manager subsystem can be used in connection with, for instance, virtualized personal computer or server-based systems, including "cloud" based computing services.

Additional Examples

In accordance with at least one aspect of this disclosure, a method for temporarily transforming a general purpose computing device into a specific-purpose appliance includes, with the computing device, detecting an event on the computing device, and in response to the event, identifying a shared system resource of the computing device to which a specific-purpose appliance application needs exclusive access while the specific-purpose appliance application is activated on the computing device, the shared system resource comprising hardware coupled to the computing device; enabling the identified shared system resource for use by the specific-purpose appliance application; disabling use of the identified shared system resource by other executable components on the computing device; and activating the specific-purpose appliance application if the identified shared system resource is enabled for use by the specific-purpose appliance application and the identified shared system resource is disabled for the other executable components.

The method may include determining if the identified shared system resource can be disabled for one of the executable components pursuant to a policy of the executable component, and if the identified shared resource cannot be disabled for the executable component, activating the specific-purpose appliance application. The method may include receiving user input, and in response to the user input, enabling use of the identified shared system resource by the component. The method may include determining if the identified shared system source can be disabled for one of the executable components pursuant to a policy of the component, and presenting a notification with the computing device if the identified shared system resource cannot be disabled for the component pursuant to the policy of the component. The method may include changing a visual display of the computing device to indicate that the specific-purpose appliance application is activated. The method may include changing a color of the visual display to a different color to indicate that the specific-purpose appliance application is activated. The method may include detecting a subsequent event with the computing device, and deactivating the specific-purpose appliance application in response to the subsequent event. The method may include detecting a condition relating to the current operating context of the computing device, and deactivating the specific-purpose appliance application in response to the detected condition.

In accordance with at least one aspect of this disclosure, a domain manager system is configured for a computing device including a plurality of isolated, independently executable domains, where the domain manager system includes a plurality of instructions embodied in one or more computer accessible storage media and executable by one or more processors to detect an event with the computing device, and in response to the event, identify a shared system resource of the computing device to which a specific-purpose domain needs exclusive access while the specific-purpose domain is activated on the computing device, the shared system resource comprising hardware coupled to the computing device; enable the identified shared system resource for use by the specific-purpose domain; disable use of the identified shared system resource by the other domains; and activate the specific-purpose domain if the identified shared system resource is enabled for the specific-purpose domain and the identified shared system resource is disabled for the other domains.

The instructions may be executable to, for each of the plurality of domains, determine if the identified shared system resource can be disabled pursuant to a policy of the domain, and if the identified shared system resource cannot be disabled for one or more of the domains, deactivate the specific-purpose domain. The instructions may be executable to receive user input, and in response to the user input, activate the specific-purpose domain and enable use of the identified shared system resource by the specific-purpose domain. The instructions may be executable to, for each of the plurality of domains, determine if the identified shared system resource can be disabled pursuant to a policy of the domain, and present a notification with the computing device if the identified shared resource cannot be disabled for the domain. The domain manager system may be embodied as one or more extensions to an Application Programming Interface (API). The domain manager system may be embodied as a trusted component of a mobile computing device having a virtualized system architecture. A computing device may be arranged according to a Multiple Independent Levels of Security (MILS) architecture and comprising any of the foregoing domain manager systems.

In accordance with at least one aspect of this disclosure, a mobile computing device includes one or more processors; and one or more machine accessible storage media having embodied therein a domain manager system, a mobile appliance application, and one or more other executable components, wherein the domain manager is executable by the one or more processors to identify a shared system resource of the mobile computing device to which the mobile appliance application needs exclusive access while the mobile appliance application is activated, where the shared system resource comprising hardware coupled to the mobile computing device; enable the identified shared system resource for use by the mobile appliance application; disable use of the identified shared system resource by the one or more other executable components; and activate the mobile appliance application if the identified shared system resource is enabled for use by the mobile appliance application and the identified shared system resource is disabled for the one or more other executable components.

The domain manager may identify the shared system resource to which the mobile appliance application needs exclusive access in response to a trigger to activate the mobile appliance application. The mobile computing device may include a control operable to authenticate a user and receive a user request to activate the mobile appliance application, and the domain manager may invoke the mobile appliance application in response to the user request. The control may include user-operable hardware coupled to the mobile computing device. The user-operable hardware may include a rotating member. The mobile computing device may include a detector operable to detect an aspect of a current operating context of the computing device, and the domain manager may be invoked in response to the detected aspect of the current operating context of the computing device.

The mobile computing device may include a general purpose mobile device that can execute a plurality of applications each using the identified shared system resource, and where activation of the mobile appliance application at least temporarily transforms the general purpose mobile device into a specific-purpose mobile appliance operable to allow the mobile appliance application access to the identified shared system resource and disable access to the identified shared system resource to the plurality of applications while the mobile appliance application is running. The mobile appliance application may include a health care application, a medical device application, a financial application, an entertainment application, an automotive application, or a business-specific application.

General Considerations

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

The invention claimed is:

1. A method for temporarily transforming a general purpose computing device into a specific-purpose appliance, the method comprising, with the computing device:
   detecting an event on the computing device, and in response to the event:
   identifying a shared system resource of the computing device to which a specific-purpose appliance application needs exclusive access while the specific-purpose appliance application is activated on the computing device, the shared system resource comprising hardware coupled to the computing device;
   enabling the identified shared system resource for use by the specific-purpose appliance application;
   disabling use of the identified shared system resource by other executable components on the computing device;
   activating the specific-purpose appliance application if the identified shared system resource is enabled for use by the specific-purpose appliance application and the identified shared system resource is disabled for the other executable components; and
   deactivating at least one of the other executable components in response to determining that the at least one of the other executable components is in conflict with the specific-purpose appliance application,
   wherein the conflict is based on the at least one of the other executable components requiring exclusive access to the shared system resource.

2. The method of claim 1, comprising determining if the identified shared system resource can be disabled for one of the executable components pursuant to a policy of the executable component, and if the identified shared resource cannot be disabled for the executable component, activating the specific-purpose appliance application.

3. The method of claim 2, comprising receiving user input, and in response to the user input, enabling use of the identified shared system resource by the component.

4. The method of claim 1, comprising determining if the identified shared system source can be disabled for one of the executable components pursuant to a policy of the component, and presenting a notification with the computing device if the identified shared system resource cannot be disabled for the component pursuant to the policy of the component.

5. The method of claim 1, comprising changing a visual display of the computing device to indicate that the specific-purpose appliance application is activated.

6. The method of claim 5, comprising changing a color of the visual display to a different color to indicate that the specific-purpose appliance application is activated.

7. The method of claim 1, comprising detecting a subsequent event with the computing device, and deactivating the specific-purpose appliance application in response to the subsequent event.

8. The method of claim 1, comprising detecting a condition relating to the current operating context of the computing device, and deactivating the specific-purpose appliance application in response to the detected condition.

9. A domain manager system for a computing device comprising a plurality of isolated, independently executable domains, the domain manager system comprising a plurality of instructions embodied in one or more computer accessible storage media and executable by one or more processors to:
   detect an event with the computing device, and in response to the event:
   identify a shared system resource of the computing device to which a specific-purpose domain needs exclusive access while the specific-purpose domain is activated on the computing device, the shared system resource comprising hardware coupled to the computing device;
   enable the identified shared system resource for use by the specific-purpose domain;
   disable use of the identified shared system resource by the other domains;
   activate the specific-purpose domain if the identified shared system resource is enabled for the specific-purpose domain and the identified shared system resource is disabled for the other domains; and
   deactivate at least one of the other domains in response to a determination that the at least one of the other domains is in conflict with the specific-purpose domain,
   wherein the conflict is based on at least one of the other domains requiring exclusive access to the shared system resource.

10. The domain manager system of claim 9, wherein the instructions are executable to, for each of the plurality of domains, determine if the identified shared system resource can be disabled pursuant to a policy of the domain, and if the identified shared system resource cannot be disabled for one or more of the domains, deactivate the specific-purpose domain.

11. The domain manager system of claim 9, wherein the instructions are executable to receive user input, and in response to the user input, activate the specific-purpose domain and enable use of the identified shared system resource by the specific-purpose domain.

12. The domain manager system of claim 9, wherein the instructions are executable to, for each of the plurality of domains, determine if the identified shared system resource can be disabled pursuant to a policy of the domain, and present a notification with the computing device if the identified shared resource cannot be disabled for the domain.

13. The domain manager system of claim 9, wherein the domain manager system is embodied as one or more extensions to an Application Programming Interface (API).

14. The domain manager system of claim 9, wherein the domain manager system is embodied as a trusted component of a mobile computing device having a virtualized system architecture.

15. A computing device arranged according to a Multiple Independent Levels of Security (MILS) architecture and comprising the domain manager system of claim 9.

16. A mobile computing device, comprising:
   one or more processors; and
   one or more machine accessible storage media having embodied therein a domain manager system, a mobile appliance application, and one or more other executable components, wherein the domain manager is executable by the one or more processors to:
   identify a shared system resource of the mobile computing device to which the mobile appliance application needs exclusive access while the mobile appliance application is activated, the shared system resource comprising hardware coupled to the mobile computing device;
   enable the identified shared system resource for use by the mobile appliance application;
   disable use of the identified shared system resource by the one or more other executable components;

activate the mobile appliance application if the identified shared system resource is enabled for use by the mobile appliance application and the identified shared system resource is disabled for the one or more other executable components; and deactivate at least one of the other executable components in response to determining that the at least one of the other executable components is in conflict with the specific-purpose appliance application, wherein the conflict is based on the at least one of the other executable components requiring exclusive access to the shared system resource.

17. The mobile computing device of claim 16, wherein the domain manager identifies the shared system resource to which the mobile appliance application needs exclusive access in response to a trigger to activate the mobile appliance application.

18. The mobile computing device of claim 17, wherein the mobile computing device comprises a control operable to authenticate a user and receive a user request to activate the mobile appliance application, and the domain manager invokes the mobile appliance application in response to the user request.

19. The mobile computing device of claim 18, wherein the control comprises user-operable hardware coupled to the mobile computing device.

20. The mobile computing device of claim 19, wherein the user-operable hardware comprises a rotating member.

21. The mobile computing device of claim 16, wherein the mobile computing device comprises a detector operable to detect an aspect of a current operating context of the computing device, and the domain manager is invoked in response to the detected aspect of the current operating context of the computing device.

22. The mobile computing device of claim 16, wherein the mobile computing device comprises a general purpose mobile device that can execute a plurality of applications each using the identified shared system resource, and wherein activation of the mobile appliance application at least temporarily transforms the general purpose mobile device into a specific-purpose mobile appliance operable to allow the mobile appliance application access to the identified shared system resource and disable access to the identified shared system resource to the plurality of applications while the mobile appliance application is running.

23. The mobile computing device of claim 22, wherein the mobile appliance application comprises a health care application, a medical device application, a financial application, an entertainment application, an automotive application, or a business-specific application.

* * * * *